US012213075B2

(12) United States Patent
Sabouri-Sichani et al.

(10) Patent No.: US 12,213,075 B2
(45) Date of Patent: Jan. 28, 2025

(54) MEASUREMENT RELAXATION CHANGE BASED ON TOTAL RECEIVED POWER

(71) Applicant: Nokia Technologies Oy, Espoo (FI)

(72) Inventors: Faranaz Sabouri-Sichani, Aalborg (DK); Thomas Bai Brondum, Aalborg (DK); Jan Torst Hviid, Klarup (DK); Daniela Laselva, Klarup (DK)

(73) Assignee: Nokia Technologies Oy, Espoo (FI)

( * ) Notice: Subject to any disclaimer, the term of this patent is extended or adjusted under 35 U.S.C. 154(b) by 328 days.

(21) Appl. No.: 17/765,038

(22) PCT Filed: Sep. 11, 2020

(86) PCT No.: PCT/FI2020/050580
§ 371 (c)(1),
(2) Date: Mar. 30, 2022

(87) PCT Pub. No.: WO2021/064281
PCT Pub. Date: Apr. 8, 2021

(65) Prior Publication Data
US 2022/0338124 A1    Oct. 20, 2022

(30) Foreign Application Priority Data
Sep. 30, 2019   (FI) .................................... 20195834

(51) Int. Cl.
*H04W 52/02*  (2009.01)
*H04L 5/00*   (2006.01)
*H04W 24/10*  (2009.01)

(52) U.S. Cl.
CPC ....... *H04W 52/0245* (2013.01); *H04L 5/0051* (2013.01); *H04W 24/10* (2013.01)

(58) Field of Classification Search
CPC .. H04W 52/0245; H04W 24/10; H04L 5/0051
(Continued)

(56) References Cited

U.S. PATENT DOCUMENTS 9,148,833 B1 *   9/2015  Singh ............... H04W 36/0094
2014/0274225 A1 * 9/2014 Lacatus ............ H04W 52/0241
                                                      455/574
2019/0254110 A1   8/2019  He et al.

OTHER PUBLICATIONS

"Summary#4 of UE power Consumption Reduction in RRM", vivo, 3GPP TSG RAN WGl Meeting #96, R1-1903764, Mar. 2019, 56 pages.
(Continued)

*Primary Examiner* — Nghi H Ly
(74) *Attorney, Agent, or Firm* — McCarter & English LLC

(57) ABSTRACT

There are provided measures for measurement relaxation change based on the total received power, in particular on an indicator of the total received power. Such measures exemplarily include, at a terminal in a radio resource management measurements relaxation mode having a reduced radio resource management measurements activity within a first relaxation mode scope as a relaxation mode scope of said radio resource management measurements relaxation mode, the terminal being served by a radio cell in a frequency band, achieving information on a parameter indicative of a total power received by said terminal at said frequency band, and deciding on a change of said relaxation mode scope of said radio resource management measurements relaxation mode based on said information on said parameter indicative of said total power received by said terminal at said frequency band.

16 Claims, 14 Drawing Sheets

(58) Field of Classification Search
USPC ........ 370/318, 328, 329, 338, 341, 345, 350
See application file for complete search history.

(56) References Cited

OTHER PUBLICATIONS

"Evaluation on the mobility impact for RRM measurement relaxation", vivo, 3GPP TSG-RAN WG2 Meeting #106, R2-1905962, 12 pages.

3GPP TS 38.306 V16.1.0 (Jul. 2020), "$3^{rd}$ Generation Partnership Project; Technical Specification Group Radio Access Network; NR; User Equipment (UE) radio access capabilities (Release 16)", 106 pgs.

3GPP TS 38.304 V15.6.0 (Dec. 2019), "$3^{rd}$ Generation Partnership Project; Technical Specification Group Radio Access Network; NR; User Equipment (UE) procedures in Idle mode and RRC Inactive state (Release 15)", 30 pgs.

3GPP TS 38.331 V16.1.0 (Jul. 2020), "$3^{rd}$ Generation Partnership Project; Technical Specification Group Radio Access Network; NR; Radio Resource Control (RRC) protocol specification (Release 16)", Sections 5.5; 5.5.2-5.5.4.

3GPP TSG-RAN WG2 Meeting 106, Reno, Nevada, USA, May 13-17, 2019, R2-1906910, "Criteria and solutions for RRM relaxation of serving cell measurements", Huawei, HiSilicon, 2 pgs.

3GPP TSG-RAN WG2 Meeting #106, Reno, NV, USA, May 13-17, 2019, R2-1906504, "Power Saving for RRM Measurements in NR", MediaTek Inc.

3GPP TSG RAN Meetings #84, Newport Beach, USA, Jun. 3-6, 2019, RP-191607, "New WID: UE Power Saving in NR", CATT, CAICT, 5 pgs.

3GPP TR 38.840 V16.0.0 (Jun. 2019), "$3^{rd}$ Generation Partnership Project; Technical specification Group Radio Access Network; NR; Study on User Equipment (UE) power saving in NR (Release 16)", 74 pgs.

"$3^{rd}$ Generation Partnership Project; Technical Specification Group Radio Access Network; NR; Physical layer measurements (Release 15)", 3GPP TS 38.215 V15.4.0, Dec. 2018, 15 pages.

\* cited by examiner

MEASUREMENT RELAXATION CHANGE BASED ON TOTAL RECEIVED POWER

CROSS REFERENCE TO RELATED APPLICATION

This patent application is a U.S. National Stage application of International Patent Application Number PCT/FI2020/050580 filed Sep. 11, 2020, which is hereby incorporated by reference in its entirety, and claims priority to FI 20195834 filed Sep. 30, 2019.

FIELD

Example embodiments relate to measurement relaxation change based on the total received power, in particular on an indicator of the total received power. More specifically, example embodiments exemplarily relate to measures (including methods, apparatuses and computer program products) for realizing measurement relaxation change based on the total received power, in particular on an indicator of the total received power.

BACKGROUND

The present specification generally relates to power saving mechanisms for mobile terminals. Such mobile terminals may for example be user equipments (UE) in mobile networks such as 3$^{rd}$ Generation Partnership Project (3GPP) 5G communication systems.

It is assumed that such UE can utilize different power saving schemes as indicated in 3GPP TR 38.840 and according to the Work Item RP-191607. In particular, power consumption reduction applying relaxation in RRM measurements is considered, where if certain conditions—e.g. UE in stationary or low mobility condition and/or favorable reference signal received power (RSRP) conditions, indicating a UE is not at cell edge, and/or a limited change of the RSRP within a time period—are fulfilled, the radio resource management (RRM) measurements can be adopted to follow more relaxed requirements.

The measurement activities are divided in measurements on reference signal(s), filtering in two levels at physical layer (L1 filtering) and then radio resource control (RRC) level (L3 filtering), and finally measurement reporting for UEs in RRC connected state. The measurements are applied directly at the UE e.g. for cell selection/reselection purposes for UEs in RRC idle/inactive state.

Each measurement, corresponding processing, and reporting consumes significant UE power which can be unnecessary when the UE is in good radio conditions. Especially, adapting measurements for lower power consumption with negligible impact in performance can be achieved for UEs in low traffic areas (thus with low/no interference), in low/semi static (low mobility) condition, where low time and frequency channel variations can be expected.

The relaxation of RRM measurements can have several levels, such as, e.g., relaxing the inter-frequency and/or inter-RAT measurements only (RAT: radio access technology), relaxing inter- as well as intra-frequency neighbor cell measurements, and complete relaxation (including serving cell).

The above-mentioned 3GPP TR 38.840 and Work Item RP-191607 suggest considering one or more of the below relaxation schemes for all of the levels mentioned above (incl. intra-frequency and/or inter frequency measurements) for UEs whose serving cell is in good radio conditions:

Increasing the measurement period
Reducing the number of samples (e.g., orthogonal frequency division multiplex[ing] (OFDM) symbols/slots) within a measurement period (e.g., SMTC window (SMTC: SS/PBCH block measurement time configuration, SS/PBCH: synchronization signal/physical broadcast channel))
Confining RRM measurements within a measurement window and increasing the periodicity of the measurement window for intra-frequency and/or inter-frequency measurement.

Furthermore, the following mechanisms can also be used to achieve UE power saving:
Reducing the number of neighbor cells targeted for intra-frequency measurement and/or inter-frequency measurement and/or inter-RAT measurement:
Assuming UE can limit the processing for measurement within a constrained time period and/or with reduced complexity
Assuming number of neighboring cells to be measured is reduced
Reducing the need in neighbor cell intra-frequency measurement, which may equivalent to reducing the number of neighbor cells that are measured.

FIG. 4 is a schematic diagram illustrating exemplary implementations of a discontinuous reception (DRX) cycle and in particular illustrates
(a) a DRX cycle with "default" DRX cycles and RRM measurements, where the measurements are performed once for each DRX cycle,
(b) relaxed RRM measurements by reducing the periodicity of the measurements, which are performed every three DRX cycles, and
(c) relaxed RRM measurements by reducing the number of measurements.

In detail, FIG. 4 illustrates exemplary RRM measurement relaxations, where measurements are shown to be aligned with DRX cycle.

This alignment, however, is not necessarily the case since it depends on the network defined measurement period configuration (e.g. SMTC cycle and offset) and the DRX configuration (DRX cycle and offset). Although it is up to UE implementation, it is reasonable to expect that most UEs perform measurements around the DRX ON-duration for power saving. Thus, in FIG. 4 it is assumed that the measurements are performed just before the DRX ON-duration.

The figure assumes a UE in RRC connected state having for each DRX cycle an DRX ON-duration. For UEs in RRC idle and inactive state, the UE monitors only one paging occasion (PO) per DRX cycle for power saving, with PDCCH monitoring occasions for paging to be determined according to the pagingSearchSpace. However, the same issue related to the lack of alignment is applicable also to a UE in RRC idle and inactive state, in case the SSB transmission by the network is not aligned with the paging monitoring occasions.

As long as a network-defined measurement period is aligned with the DRX cycle, the major contributor to power saving is the increase of the measurement periodicity and the removal of neighbors from the neighbor cell measurements in scope, to reduce the UE activity for running the measurements.

However, as mentioned above, it is not always possible for the network to ensure the alignment of the measurement period with the DRX cycle, at least it may not be possible for all the UEs in the network, as is the case in FIG. 4. That is, the alignment between the synchronization signal block (SSB) transmission timing and DRX ON-duration/paging monitoring timing cannot be achieved for all UEs, and therefore, such alignment cannot be (always) assumed.

Hence, in case the measurements are not aligned with the DRX cycle, it is beneficial that in a given DRX cycle any measurements—including the serving cell measurement—can be relaxed, since to perform measurements outside the DRX ON-duration, the UE needs to power-up and power-down an additional time to performing the measurements, in addition to the power-up and power-down needed in connection to the PDCCH monitoring at a given DRX cycle.

This would add significantly to the total power consumption even when it is only one cell (the serving one) to be measured.

According to the UE power model defined in the above-mentioned 3GPP TR 38.840, a total transition time of 20 ms (or 6 ms) should be considered for UE's power-up plus power-down time from deep sleep (or light sleep), to the active state, in which measurements can be performed.

The ramping up/down time entails a ramping up/down power consumption, which is of 450 units (for deep sleep) and 100 units (for light sleep).

Considering that the measurement period lasts 3 or 5 ms at the most, this is significantly shorter than the ramping up/down.

Accordingly, when considering one DRX cycle with no data and misaligned SSBs, the UE performs a power ramping up/down for monitoring the DRX ON-duration lasting e.g. 8 ms (with e.g. an Rx power level at about 100 units per slot) and an additional power ramping up/down for RRM measurement lasting 3 ms (e.g. Rx power level at about 100 units per slot), the latter contribution is rather significant.

This highlights the importance from UE power saving view to avoid measuring altogether, whenever possible.

FIG. 5 is a schematic diagram illustrating an implementation of a discontinuous reception cycle and in particular illustrates a DRX cycle, DRX ON-durations (in general the PDCCH monitoring period within the DRX cycle) and measurement windows.

In particular, FIG. 5 illustrates how a measurement which is not aligned with DRX cycle will result in increase in UE's total active time and prevent it to go to deep sleep (or light sleep) or stay longer in such power efficient state.

The RRM measurements (e.g. reference signal received power (RSRP)/reference signal received quality (RSRQ)) are used to constantly evaluate the quality of the UE connection towards its serving cell and its (intra/inter-frequency/inter-RAT) neighbor cells.

In general, the UE monitors/measures the neighboring cell's signal compared to its serving cell signal. The measurements are directly applied by the UE for triggering handover by the network (in RRC_connected mode) or for cell reselection (in RRC_idle/inactive mode).

Namely, when in RRC Connected mode, the UE reports correspondingly the results to the network (NW) when specific change(s) in the signal condition is(are) observed, according to configured measurements events such as e.g. measurement reporting event A3 (3GPP TS 38.331).

The NW ensures that a UE in RRC connected state is connected to the best NB measured by signal level and quality by evaluating the measurement reports and requesting a hand-over to a new target cell if the measurements show better coverage from the target cell.

On the other hand, whenever the UE has selected a cell based on the cell selection procedure, the UE (i.e. in RRC_idle/inactive mode) will continue to look for a better cell as candidate for reselection according to the reselection evaluation process.

In order to find better cells as candidate for reselection, the UE measures neighbor cells.

The neighbor cells are indicated in an intra-frequency neighbor cell list and an inter-frequency neighbor carrier frequency list by the serving cell.

In addition thereto, the network may ban the UE to consider some cells for reselection (i.e. black listing of intra/inter-frequency cells).

To limit the RRM measurements for reselection, the UE may be configured (e.g. by the network) such that the UE does not have to perform measurements, if the serving cell is good enough (i.e. S-measure condition, see 3GPP TS 38.304/36.304).

However, for priority based reselection, the UE needs to always measure higher priority carrier frequencies.

For cell reselection in multi-beam operations, the measurement quantity is the linear average of the measurement quantity values of N beams (nrofSS-BlocksToAverage) above the threshold (absThreshSS-BlocksConsolidation). If not a single beam is above the threshold, the UE considers the cell measurement quantity to be equal to a highest beam measurement quantity.

Based on estimating good signal condition and low mobility (e.g. RSRP serving cell being above a threshold defined by the network), the UE can relax the RRM measurements as described above.

A UE in RRC_idle/inactive mode may relax its neighbor cells measurements based on a so-called S-measure mechanism (see 3GPP TS 38.304/36.304) or based on measurements relaxation conditions according to the Work Item RP-191607 (UE power saving in NR work item). When applying relaxation, the UE may fail to detect the presence of strong neighbor cells, which may act as strong interferer requiring the need for a cell reselection. Eventually the UE may also experience an out of coverage situation, where the current serving cell (i.e. the camping cell) becomes not good enough because of missing in-time neighbor cell measurements and consequent lack of cell reselection. For UEs in RRC_connected mode, similarly this may trigger a radio link failure due to the lack of a timely measurement reporting and handover.

Furthermore, if the applied relaxation includes also the serving cell measurements, when the NW condition changes—for instance due to the UE's (sudden) increased mobility—the UE may also fail to detect the fast change due to missing RSRP/RSRQ measurements, and this may eventually also end up in radio link failure (RLF).

Hence, the problem arises that the UE's ability to track the change in radio link condition of its serving cell as well as of its neighbor cells is reduced when it is in power saving mode (utilizing relaxed RRM measurement schemes).

Thus, there is a benefit to use indirect information about the radio relevance of cells and the change in radio relevance in the absence of direct measurements (i.e. without intra-frequency, inter-frequency, and/or inter-RAT measurements during measurement relaxation). The radio relevance can be defined for instance as a relative measure, by ranking the cells from the strongest cell (i.e. the cell with the highest relevance) to the weakest cell (lowest relevance). Also, it could be defined as an absolute measure, where the relevant cells are the ones whose radio level/quality is good enough, e.g. above an absolute threshold. Thus, an indirect information about any changes in radio relevance of neighbor cells in comparison to the serving cell and/or about changes in time in radio condition of the serving cell could be used to adjust the relaxation mode. We remark that although the primary cause of changes in radio relevance may be UE mobility, in general changes in the radio environment may be caused by other factors as well, such as the mobility of other UEs and/or other objects present in the environment.

SUMMARY

Various example embodiments aim at addressing at least part of the above issues and/or problems and drawbacks.

Various aspects of example embodiments are set out in the appended claims.

According some aspects, there is provided the subject matter of the independent claims. Some further aspects are defined in the dependent claims.

The embodiments that do not fall under the scope of the claims are to be interpreted as examples useful for understanding the disclosure.

According to an exemplary aspect, there is provided a method of a terminal in a radio resource management measurements relaxation mode having a reduced radio resource management measurements activity within a first relaxation mode scope as a relaxation mode scope of said radio resource management measurements relaxation mode, the terminal being served by a radio cell in a frequency band, the method comprising achieving information on a parameter indicative of a total power received by said terminal at said frequency band, and deciding on a change of said relaxation mode scope of said radio resource management measurements relaxation mode based on said information on said parameter indicative of said total power received by said terminal at said frequency band.

According to an exemplary aspect, there is provided an apparatus of a terminal in a radio resource management measurements relaxation mode having a reduced radio resource management measurements activity within a first relaxation mode scope as a relaxation mode scope of said radio resource management measurements relaxation mode, the terminal being served by a radio cell in a frequency band, the apparatus comprising achieving circuitry configured to achieve information on a parameter indicative of a total power received by said terminal at said frequency band, and deciding circuitry configured to decide on a change of said relaxation mode scope of said radio resource management measurements relaxation mode based on said information on said parameter indicative of said total power received by said terminal at said frequency band.

According to an exemplary aspect, there is provided an apparatus of a terminal in a radio resource management measurements relaxation mode having a reduced radio resource management measurements activity within a first relaxation mode scope as a relaxation mode scope of said radio resource management measurements relaxation mode, the terminal being served by a radio cell in a frequency band, the apparatus comprising at least one processor, at least one memory including computer program code, and at least one interface configured for communication with at least another apparatus, the at least one processor, with the at least one memory and the computer program code, being configured to cause the apparatus to perform achieving information on a parameter indicative of a total power received by said terminal at said frequency band, and deciding on a change of said relaxation mode scope of said radio resource management measurements relaxation mode based on said information on said parameter indicative of said total power received by said terminal at said frequency band.

According to an exemplary aspect, there is provided a computer program product comprising computer-executable computer program code which, when the program is run on a computer (e.g. a computer of an apparatus according to any one of the aforementioned apparatus-related exemplary aspects), is configured to cause the computer to carry out the method according to any one of the aforementioned method-related exemplary aspects.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient estimation of prediction of a change of mobility and radio conditions even in relaxed measurement mode to thereby solve at least part of the problems and drawbacks identified in relation to the prior art.

By way of example embodiments, there is provided indirect information on the change in radio relevance of cells (serving/camping cell and neighbor cells) and/or mobility state estimation for measurement relaxation adaptation. More specifically, by way of example embodiments, there are provided measures and mechanisms for realizing estimation of change in radio relevance and/or mobility state estimation for measurement relaxation.

Thus, improvement is achieved by methods, apparatuses and computer program products enabling/realizing estimation of change in radio relevance and/or mobility state estimation for measurement relaxation, specifically for measurement relaxation change based on the total received power, in particular on an indicator of the total received power.

BRIEF DESCRIPTION OF THE DRAWINGS

In the following, example embodiments will be described in greater detail by way of non-limiting examples with reference to the accompanying drawings, in which.

DETAILED DESCRIPTION OF DRAWINGS AND EMBODIMENTS

Figure 1:
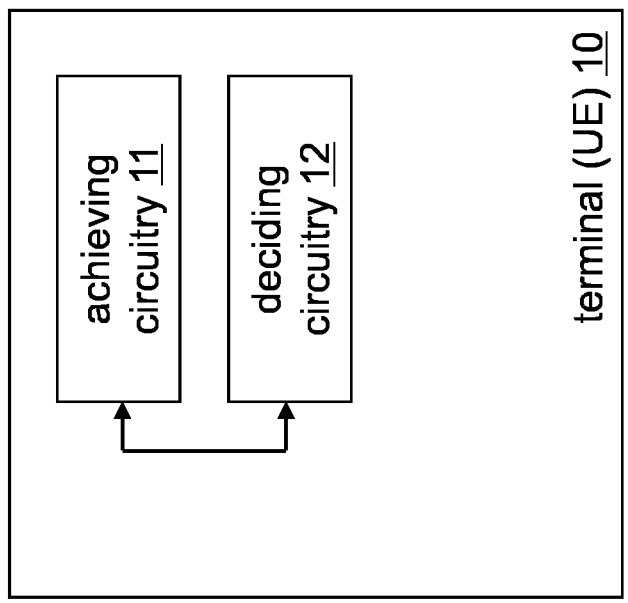
FIG. 1 is a block diagram illustrating an apparatus according to example embodiments.

Example embodiments are described herein with reference to particular non-limiting examples and to what are presently considered to be conceivable embodiments. A person skilled in the art will appreciate that the invention is by no means limited to these examples and may be more broadly applied.

It is to be noted that the following description of the example embodiments mainly refers to specifications being used as non-limiting examples for certain exemplary network configurations and deployments. Namely, the example embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples and does naturally not limit the invention in any way. Rather, any other communication or communication related system deployment, etc. may also be utilized as long as compliant with the features described herein.

Hereinafter, various embodiments and implementations and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to example embodiments, in general terms, there are provided measures and mechanisms for (enabling/realizing) measurement relaxation change based on the total received power, in particular on an indicator of the total received power.

The following can be generally assumed on RRM measurement relaxation, and is considered for example embodiments:

1. RRM measurement relaxation can be applicable in RRC_CONNECTED, RRC_INACTIVE and RRC_IDLE.
2. Relaxed monitoring criteria under which the UE may relax RRM measurements can consider both low mobility and UE location in the cell (e.g. whether the UE is in cell-edge) and may include the following aspects, but are not limited to:
    a. UE mobility status (e.g. serving cell variation, speed, movement, direction, cell (re-selection, UE type, etc.),
    b. Link quality (e.g. serving cell threshold/quality, position in cell, etc.),
    c. Serving cell beam status (e.g. beam change, direction, beam specific link condition, etc.).
3. The UE may activate relaxed measurement criteria if at least any of the following conditions are met:
    a. Serving Cell measurement does not change more than a relative threshold during a time period;
    b. UE is not a cell edge, meaning that serving cell/beam RSRP/RSRQ/SINR is above a threshold.
4. Serving cell measurements can be included in the evaluation of relaxed RRM measurements as well.

In general, in order to address the above-identified problem that the UE's ability to track the change in radio link condition of its serving cell as well as of its (intra-frequency) neighbor cells is reduced when it is in power saving mode (utilizing relaxed RRM measurement schemes), according to the concept of example embodiments, alternative indicators are utilized to detect potential quality degradation when missing RSRP/RSRQ measurements.

Contrary thereto, currently known mobility measures rely on serving cell RRM measurements (RSRP/RSRQ) even when they are relaxed. This is mainly assuming that the RSRP of the serving cell will determine whether to relax the measurements of the neighbor cells. In order to evaluate a UE's mobility state and/or change in radio relevance it was suggested to use external/non-3GPP information as e.g. from GPS.

In particular, according to the general concept of example embodiments, it is assumed that a stationary UE in good channel conditions has relaxed the measurements of the serving cell and/or the intra-frequency neighbor cells.

As described above, this leads to a higher risk of getting out of coverage in RRC_idle/inactive or RLF in RRC_connected and, thus, degraded quality of service (QoS). To avoid such consequences, according to example embodiments, the UE compensates for its relaxed measurements, hence, reduced knowledge about its mobility and radio channel status, by utilizing other available measures, i.e. other than RRM measurements.

A UE in RRC connected mode is still running its normal operations related to the user-plane and control-plane exchanges in downlink (DL) and uplink (UL) according to its traffic and to maintain the connection to its serving cell.

Specifically, on the DL side, the UE is continuously adjusting its receiver gain to keep the received signal level within a level where the signal can be decoded with the required error rate, as part of the automatic gain control (AGC) algorithm. For that purpose, the UE measures continuously (for each downlink user plane transmission), a total received power.

Similarly, a UE in RRC_idle or RRC_inactive will monitor the PDCCH for paging messages and, in doing so, it applies similar receiver gain adjustments as mentioned above to keep the received signal level within a level where the signal can be decoded with the required error rate, as part of the automatic gain control (AGC) algorithm.

Hence, a UE in both RRC Connected and Idle/Inactive has knowledge of the total received power and can extract information about changes in radio relevance by determining changes in the total received power and/or by comparing relatively the serving cell RSRP (if available) with the total received power and/or their relative changes.

The total received power may be, for example, the carrier received signal strength indicator (RSSI), but is not limited thereto.

The received signal strength indicator metric is defined for 5G NR in Sect. 5.1.3 of 3GPP TS 38.215 as follows:

NR carrier Received Signal Strength Indicator (NR carrier RSSI), comprises the linear average of the total received power (in [W]) observed only in certain OFDM symbols of measurement time resource(s), in the measurement bandwidth, over N number of resource blocks from all sources, including co-channel serving and non-serving cells, adjacent channel interference, thermal noise etc. The measurement time resource(s) for NR Carrier RSSI are confined within SS/PBCH Block Measurement Time Configuration (SMTC) window duration.

The total received power is an example of the "(information on a parameter indicative of a) total power received by said terminal at said frequency band" used in the description below.

According to the overall concept of example embodiments, the UE monitors and uses the measured total received power (e.g. carrier RSSI) level and its change in time as an indicator for the UE to detect (sudden) changes/degradation occurring in the channel condition of its serving cell and/or neighbor cells.

Basically, when the level of the total received power (e.g. RSSI level) crosses a minimum threshold and/or the slope of the total received power (e.g. RSSI slope) changes (e.g. becomes steeper by a delta) during a period, this indicates that the serving cell is degrading to a dangerous level and/or a neighbor may be becoming a too stronger interferer.

Thus, according to example embodiments, the UE triggers a timely exiting from the current measurement mode (e.g. relaxation mode).

As a result, this total received power based (e.g. RSSI based) in-time detection of the radio changes triggers the UE to change the currently adopted relaxation mode/scope e.g. including start measuring RSRP/RSRQ (as an example of a start of less relaxed RRM measurements) to be used for UEs evaluation of potential cell reselection in RRC Idle/Inactive (avoiding getting out of coverage) and/or provide necessary RRM measurements reporting to the NW such that the NW is enabled to initiate in-time handover (HO) procedure in RRC_connected mode, and to avoid RLF (due to missing in-time HO).

Figure 3:
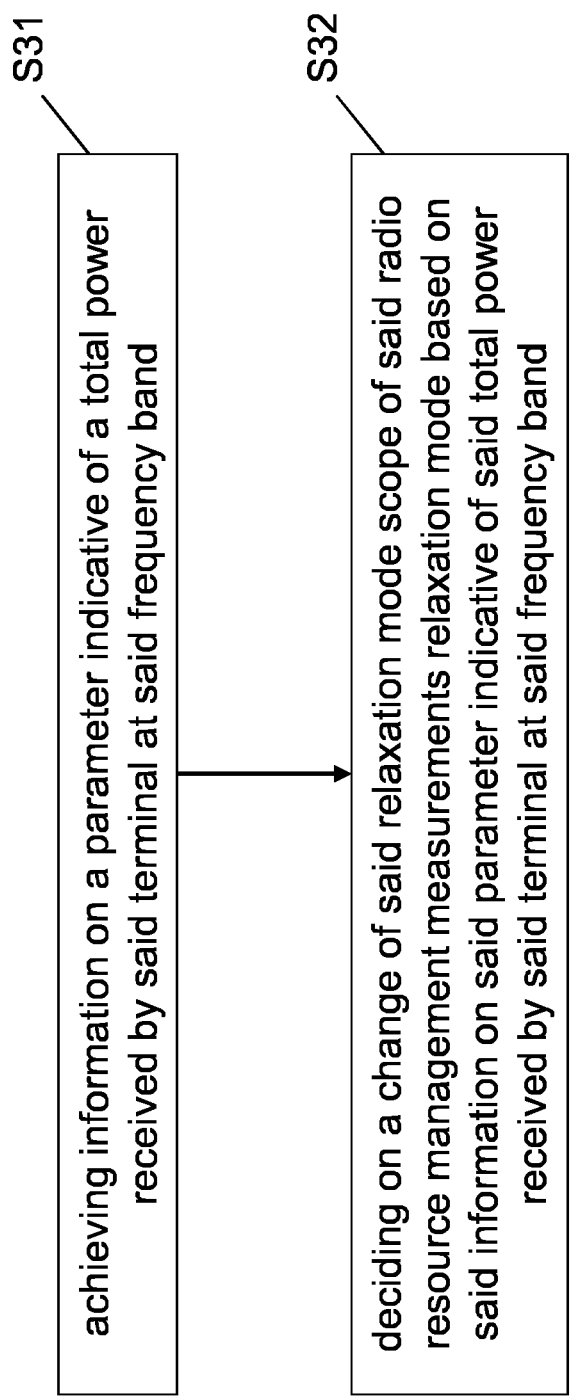
FIG. 3 is a schematic diagram of a procedure according to example embodiments.
Figure 4:
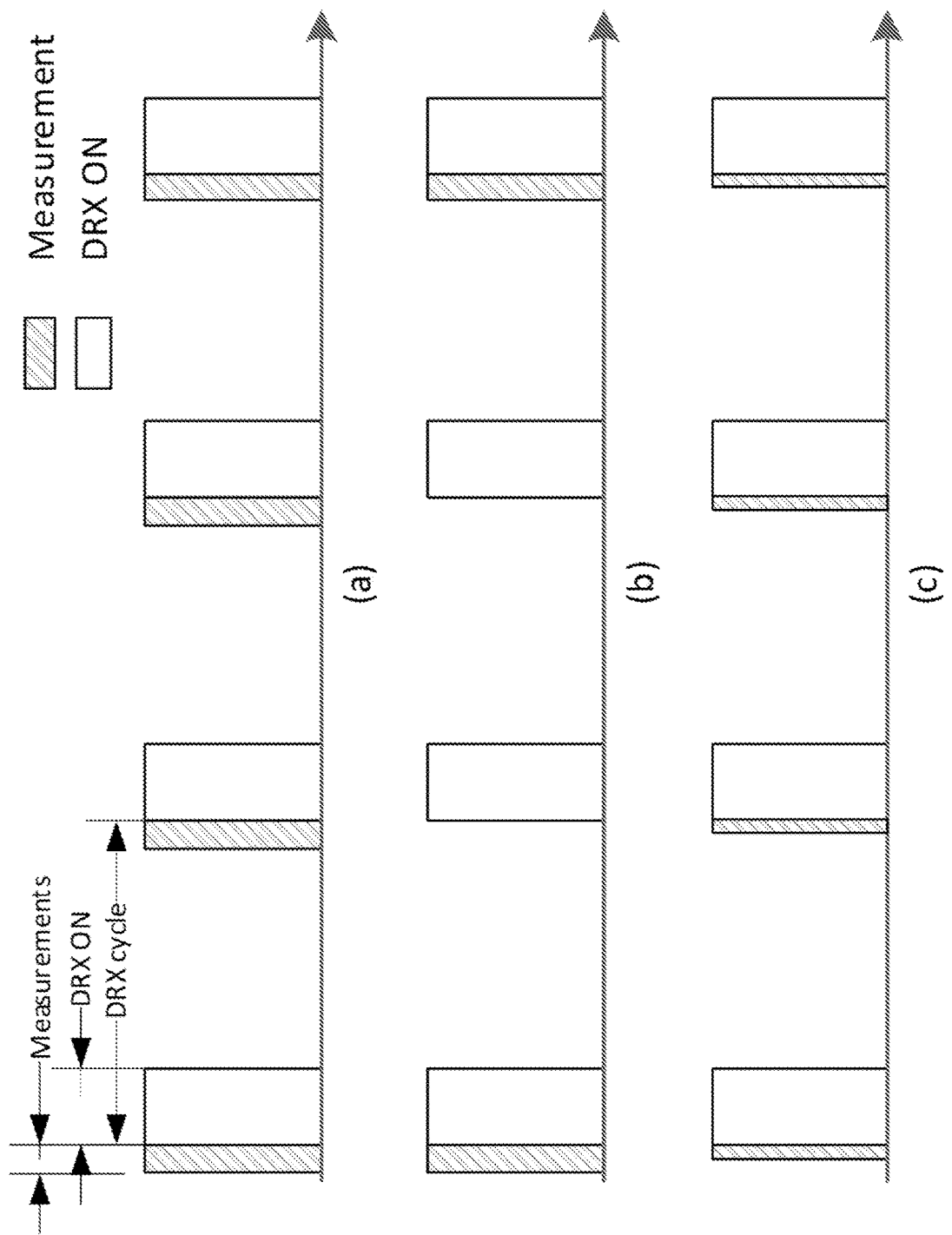
FIG. 4 is a schematic diagram illustrating implementations of a discontinuous reception cycle, and default RRM measurements (a) together with two possible measurement relaxation schemes (b and c)
Figure 5:
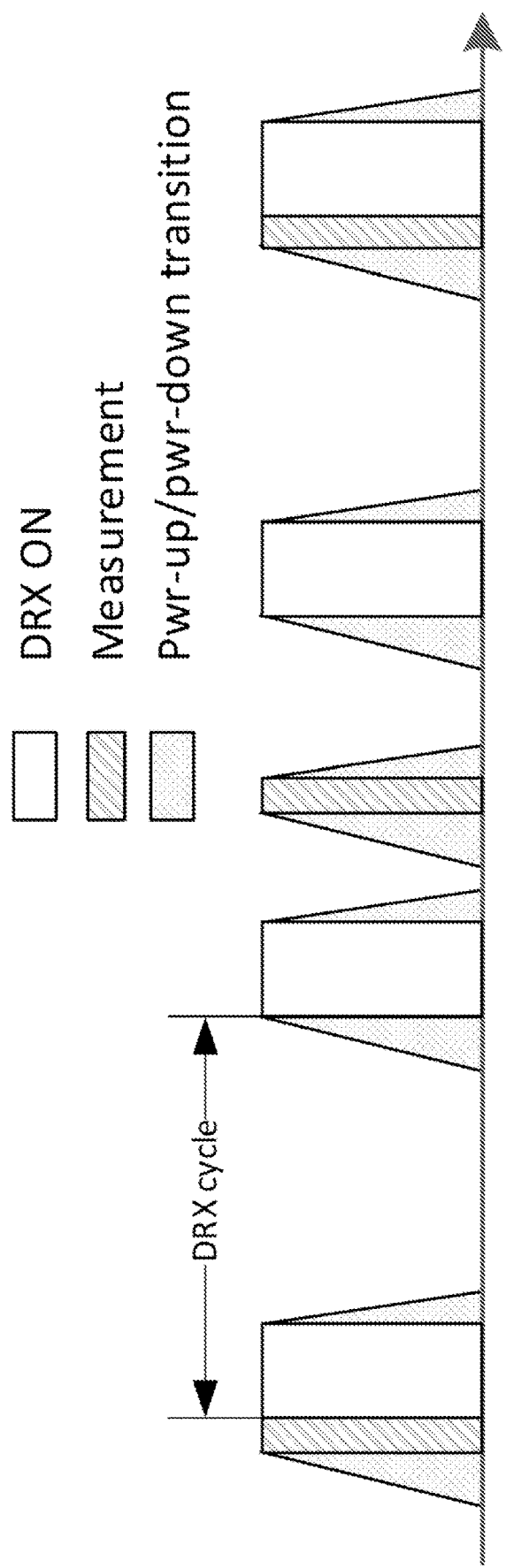
FIG. 5 is a schematic diagram illustrating an implementation of a discontinuous reception cycle, and RRM measurements together with UE's power-up and power-down.

In more specific terms, FIG. 1 is a block diagram illustrating an apparatus according to example embodiments. The apparatus may be terminal 10 such as a user equipment (UE) in a radio resource management measurements relaxation mode having a reduced radio resource management measurements activity within a first relaxation mode scope as a relaxation mode scope of said radio resource management measurements relaxation mode. The apparatus (as or at the terminal) is served by a radio cell in a frequency band. The apparatus (as or at the terminal) comprises an achieving circuitry 11 and a deciding circuitry 12. The achieving circuitry 11 achieves information on a parameter indicative of a total power received by said terminal at said frequency band. The deciding circuitry decides on a change of said relaxation mode scope of said radio resource management measurements relaxation mode based on said information on said parameter indicative of said total power received by said terminal at said frequency band. FIG. 3 is a schematic diagram of a procedure according to example embodiments. The apparatus according to FIG. 1 may perform the method of FIG. 3 but is not limited to this method. The method of FIG. 3 may be performed by the apparatus of FIG. 1 but is not limited to being performed by this apparatus.

As shown in FIG. 3, a procedure (of a terminal in a radio resource management measurements relaxation mode having a reduced radio resource management measurements activity within a first relaxation mode scope as a relaxation mode scope of said radio resource management measurements relaxation mode, the terminal being served by a radio cell in a frequency band) according to example embodiments comprises an operation of achieving (S31) information on a parameter indicative of a total power received by said terminal at said frequency band, and an operation of deciding (S32) on a change of said relaxation mode scope of said radio resource management measurements relaxation mode based on said information on said parameter indicative of said total power received by said terminal at said frequency band.

Figure 2:
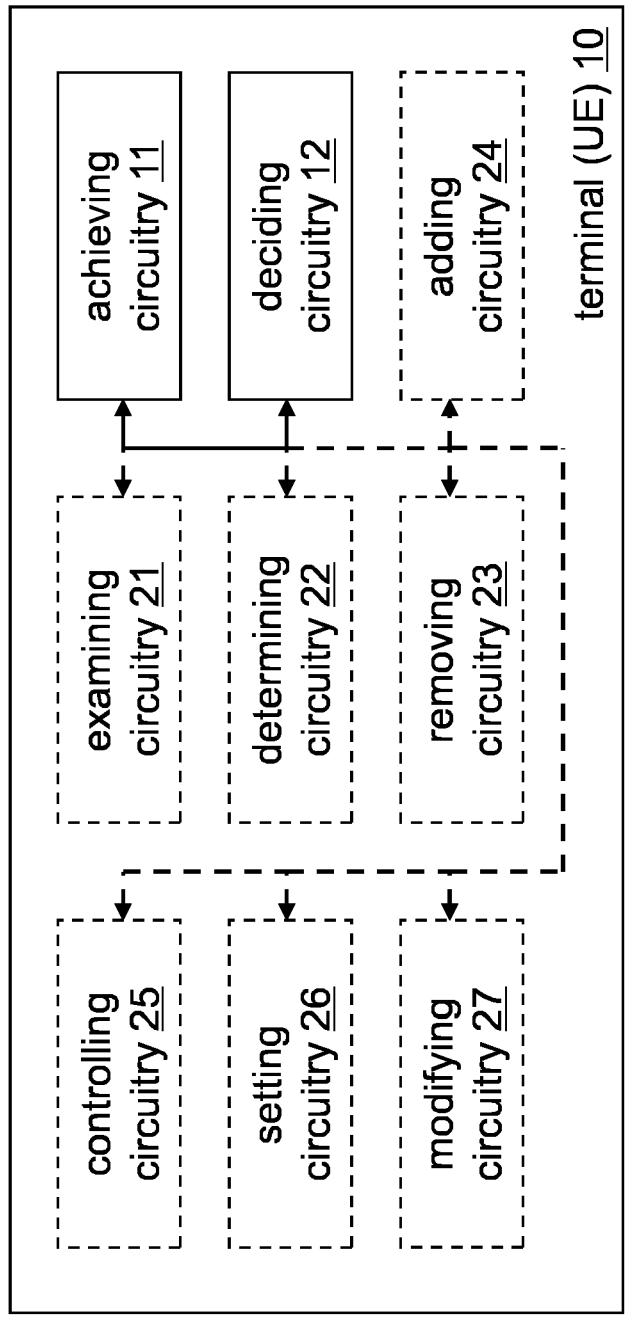
FIG. 2 is a block diagram illustrating an apparatus according to example embodiments.

FIG. 2 is a block diagram illustrating an apparatus according to example embodiments. In particular, FIG. 2 illustrates a variation of the apparatus shown in FIG. 1. The apparatus according to FIG. 2 may thus further comprise examining circuitry 21, determining circuitry 22, removing circuitry 23, adding circuitry 24, controlling circuitry 25, setting circuitry 26, and/or modifying circuitry 27.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

The "(parameter indicative of a) total power received by said terminal at said frequency band" may alternatively be denoted as a "(parameter indicative of a) radio wave source agnostic total power received by said terminal at said frequency band".

Here, the term "radio wave source agnostic" represents the characteristic "from all sources incl. thermal noise etc." and thus provides a substantial difference to RSRP being only a measure for the power received (within the cell-specific reference signals) from the serving cell.

Furthermore, the term "parameter indicative of" considers the circumstance that the total received power (e.g. RSSI) may be a "linear average of the total received power" and in particular power "observed only in configured OFDM symbol(s)"

In other words, the "(information on a parameter indicative of a) radio wave source agnostic total power received by said terminal at said frequency band" differs at least from e.g. the RSRP in that
  the total received power (e.g. RSSI) may be measured in time outside the network-defined period (SMTC) as it is measured in connection with the reception of a data channel to help data channel decoding,
  the total received power (e.g. RSSI) may be measured in frequency outside the configured bandwidth to be used at a given time by the UE (i.e. the active Bandwidth Part, BWP), and
  the total received power (e.g. RSSI) is not a measure of a channel nor a signal sent by the gNB, instead it is the energy/power measured over the entire bandwidth, which comprises the energy transmitted by any sources (also interferers/neighbor cells).

According to a variation of the procedure shown in FIG. 3, exemplary details of the deciding operation (S32) are given, which are inherently independent from each other as such.

Such exemplary deciding operation (S32) according to example embodiments may comprise an operation of examining whether said information on said parameter indicative of said total power received by said terminal at said frequency band is indicative of exceeding a predetermined radio condition deterioration with respect to said radio connection of said terminal, and an operation of determining, if said information on said parameter indicative of said total power received by said terminal at said frequency band is indicative of exceeding said predetermined radio condition deterioration with respect to said radio connection of said terminal, to decrease said relaxation mode scope of said radio resource management measurements relaxation mode.

According to further example embodiments, said terminal is in any of a radio resource control connected state, a radio resource control idle state, and a radio resource control inactive state.

According to still further example embodiments, said first relaxation mode scope includes radio resource management measurements with respect to a serving cell of said terminal, radio resource management measurements with respect to intra-frequency neighbor cells of said terminal, inter-frequency radio resource management measurements, and inter-radio-access-technology radio resource management measurements.

According to a variation of the procedure shown in FIG. 3, exemplary additional operations are given, which are inherently independent from each other as such. According to such variation, an exemplary method according to example embodiments may comprise an operation of removing, if said information on said parameter indicative of said total power received by said terminal at said frequency band is smaller than a total received power threshold, said radio resource management measurements with respect to said serving cell of said terminal from said relaxation mode scope of said radio resource management measurements relaxation mode.

According to a variation of the procedure shown in FIG. 3, exemplary additional operations are given, which are inherently independent from each other as such. According to such variation, an exemplary method according to example embodiments may comprise an operation of adding, if a reference signal received power with respect to said serving cell of said terminal acquired by said radio resource management measurements with respect to said serving cell of said terminal is equal to or larger than a first reference signal received power threshold, said radio resource management measurements with respect to said serving cell of said terminal to said relaxation mode scope of said radio resource management measurements relaxation mode.

According to a variation of the procedure shown in FIG. 3, exemplary additional operations are given, which are inherently independent from each other as such. According to such variation, an exemplary method according to example embodiments may comprise an operation of removing, if said reference signal received power with respect to said serving cell of said terminal acquired by said radio resource management measurements with respect to said serving cell of said terminal is smaller than a second reference signal received power threshold smaller than said first reference signal received power threshold, said radio resource management measurements with respect to said intra-frequency neighbor cells of said terminal from said relaxation mode scope of said radio resource management measurements relaxation mode.

According to a variation of the procedure shown in FIG. 3, exemplary additional operations are given, which are inherently independent from each other as such. According to such variation, an exemplary method according to example embodiments may comprise an operation of removing, if said reference signal received power with respect to said serving cell of said terminal acquired by said radio resource management measurements with respect to said serving cell of said terminal is smaller than a second reference signal received power threshold smaller than said first reference signal received power threshold, said inter-frequency radio resource management measurements and said inter-radio-access-technology radio resource management measurements from said relaxation mode scope of said radio resource management measurements relaxation mode.

According to a variation of the procedure shown in FIG. 3, exemplary details of the deciding operation (S32) are given, which are inherently independent from each other as such.

Such exemplary deciding operation (S32) according to example embodiments may comprise an operation of modifying a measurement periodicity of a reference signal received power with respect to said serving cell of said terminal acquired by said radio resource management measurements with respect to said serving cell of said terminal based on said information on said parameter indicative of said total power received by said terminal at said frequency band.

According to further example embodiments, said terminal undergoes discontinuous reception defined by a discontinuous reception cycle, and said reference signal received power with respect to said serving cell of said terminal is acquired by said radio resource management measurements with respect to said serving cell of said terminal at every $N^{th}$ discontinuous reception cycle, where a periodicity control value N is an integer value. For such case, exemplary details of the modifying operation are given, which are inherently independent from each other as such. Such exemplary modifying operation according to example embodiments may comprise an operation of setting said periodicity control value N based on said information on said parameter indicative of said total power received by said terminal at said frequency band.

According to still further example embodiments, said first relaxation mode scope includes radio resource management measurements with respect to intra-frequency neighbor cells of said terminal, inter-frequency radio resource management measurements, and inter-radio-access-technology radio resource management measurements and excludes radio resource management measurements with respect to a serving cell of said terminal.

According to a variation of the procedure shown in FIG. 3, exemplary details of the deciding operation (S32) are given, which are inherently independent from each other as such.

Such exemplary deciding operation (S32) according to example embodiments may comprise an operation of controlling radio resource management measurements relaxation with respect to neighbor cells of said terminal based on
  a reference signal received power with respect to said serving cell of said terminal acquired by said radio resource management measurements with respect to said serving cell of said terminal, and
  said information on said parameter indicative of said total power received by said terminal at said frequency band.

According to a variation of the procedure shown in FIG. 3, exemplary additional operations are given, which are inherently independent from each other as such. According to such variation, an exemplary method according to example embodiments may comprise an operation of removing, if a reference signal received power with respect to said serving cell of said terminal acquired by said radio resource management measurements with respect to said serving cell of said terminal is identified as being substantially unchanged with respect to a first preceding measurement or an average value of a first predetermined number of first preceding measurements and said information on said parameter indicative of said total power received by said terminal at said frequency band is identified as being increased with respect to a second preceding measurement or an average value of a second predetermined number of second preceding measurements, said radio resource management measurements with respect to said intra-frequency neighbor cells of said terminal from said relaxation mode scope of said radio resource management measurements relaxation mode.

The formulation "substantially unchanged" includes the case where the respective quantity (e.g. reference signal received power) is kept constant, and the case where the respective quantity is kept constant within a measuring tolerance. The formulation "substantially unchanged" may also include the case where changes in time are limited, i.e. a current value compared to the preceding value or an averaged measurement value is within a limit defined dependent on the need.

According to a variation of the procedure shown in FIG. 3, exemplary additional operations are given, which are inherently independent from each other as such. According to such variation, an exemplary method according to example embodiments may comprise an operation of removing, if said reference signal received power with respect to said serving cell of said terminal acquired by said radio resource management measurements with respect to said serving cell of said terminal is identified as being substantially unchanged with respect to said first preceding measurement or said average value of said first predetermined number of first preceding measurements and said information on said parameter indicative of said total power received by said terminal at said frequency band is identified as being increased with respect to said second preceding measurement or said average value of second first predetermined number of second preceding measurements, said inter-frequency radio resource management measurements and said inter-radio-access-technology radio resource management measurements from said relaxation mode scope of said radio resource management measurements relaxation mode.

According to a variation of the procedure shown in FIG. 3, exemplary additional operations are given, which are inherently independent from each other as such. According to such variation, an exemplary method according to example embodiments may comprise an operation of removing, if said reference signal received power with respect to said serving cell of said terminal acquired by said radio resource management measurements with respect to said serving cell of said terminal is identified as being decreased with respect to said first preceding measurement or said average value of said first predetermined number of first preceding measurements, said radio resource management measurements with respect to said intra-frequency neighbor cells of said terminal from said relaxation mode scope of said radio resource management measurements relaxation mode.

According to a variation of the procedure shown in FIG. 3, exemplary additional operations are given, which are inherently independent from each other as such. According to such variation, an exemplary method according to example embodiments may comprise an operation of removing, if said reference signal received power with respect to said serving cell of said terminal acquired by said radio resource management measurements with respect to said serving cell of said terminal is identified as being decreased with respect to said first preceding measurement or said average value of said first predetermined number of first preceding measurements, said inter-frequency radio resource management measurements and said inter-radio-access-technology radio resource management measurements from said relaxation mode scope of said radio resource management measurements relaxation mode.

According to still further example embodiments, said information on said parameter indicative of said total power received by said terminal at said frequency band is a value of a total received power indicator.

Alternatively, said information on said parameter indicative of said total power received by said terminal at said frequency band is a change of said total received power indicator per unit time.

According to still further example embodiments, said total received power indicator is calculated for automatic gain control processing.

The example embodiments outlined above use a two-part concept including a radio resource management measurements relaxation mode and a relaxation mode scope of the radio resource management measurements relaxation mode.

The relaxation mode itself means that measurements activity (i.e. periodicity, number) is reduced, i.e., relaxed.

The scope of the relaxation mode means the measurement targets for which the measurements activity is reduced/relaxed.

The scope of the relaxation mode can be imagined as a list of measurement targets for which measurements are relaxed (according to the relaxation mode).

Accordingly, if a measurement target is removed from the list, the relaxation (i.e. reduced periodicity, number) defined for this measurement target is removed, and the measurements for this measurement target are "set to normal".

On the other hand, if a measurement target is added to the list, the relaxation (i.e. reduced periodicity, number) defined for this measurement target is activated.

In other words, relaxation measures are fixedly defined for measurements activities (defined by e.g. periodicity, number of cells per measurement target) with respect to respective relaxation targets (fixed relaxation mode), and these fixedly defined relaxation measures mean a reduction in measurement activity (for the respective relaxation target). These definitions are not changed.

On the other hand, a dynamic scope of the relaxation mode is maintained, which means the consideration or non-consideration of measurement targets for reduction of the measurement activities according to their respectively defined relaxation measures.

The measurement targets can be added to the scope, meaning that their measurements will be relaxed according to the relaxation mode.

The measurement targets can be removed from the scope, meaning that their measurements will not be relaxed according to the relaxation mode.

Exemplary embodiments outlined above are depicted below in more detail.

As mentioned above, independent of the UE's configured RRM measurements—given as RSRP and RSRQ—the UE has to compute values of a total received power (e.g. RSSI values) as part of the continuous reception operations, i.e. the decoding of user-plane downlink transmissions.

To keep a good relation between the received signal strength and the dynamic behavior of the signal due to fading etc., the receiver is designed with an AGC where the estimated reception (RX) level will target a setpoint optimized for the receiver.

Figure 6:
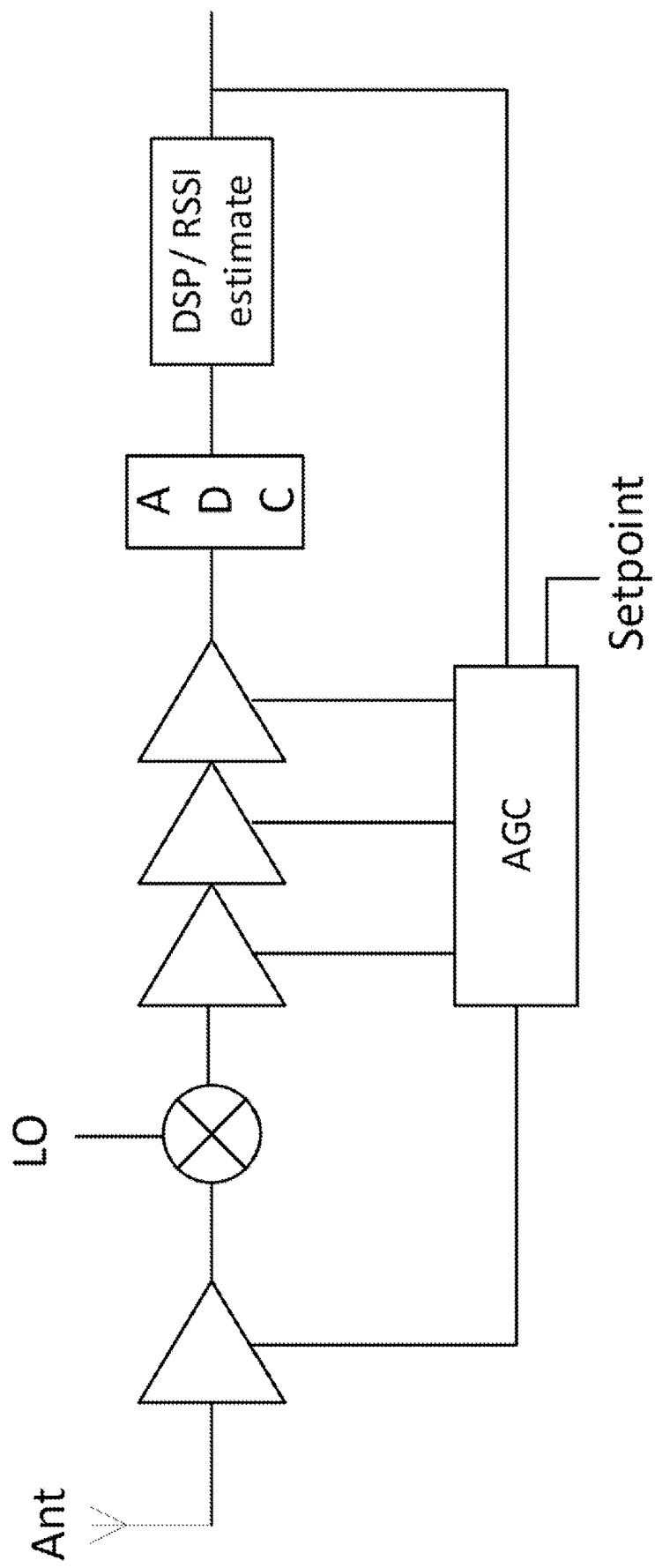
FIG. 6 is a schematic diagram schematically illustrating receiver.

FIG. 6 is a schematic diagram schematically illustrating such a receiver and in particular shows an example of a receive chain.

As is outlined in FIG. 6, the total received power (e.g. RSSI) is then estimated in a digital signal processor (DSP), and the AGC will then compensate the measured delta between the total received power (e.g. RSSI) and the target setpoint by optimizing the gain in the RX path.

The total received power (e.g. RSSI) includes not only the power level of the UE's serving cell but also received power from co-channel non-serving cells, adjacent channel interference, thermal noise, etc. Hence, it is important to notice the contribution from the unwanted signals.

However, it is expected that the dominant part of the total received power (e.g. RSSI) is from the serving cell when the UE is at the cell center, i.e. close to the NodeB (NB, e.g. gNB), such that a reduction of the level of the total received power (e.g. RSSI level) is expected as the UE moves away from its serving NB, before the contribution of the total received power (e.g. RSSI contribution) from the strongest neighbors potentially raises, as the UE starts to receive stronger signals from these cells.

Figure 7:
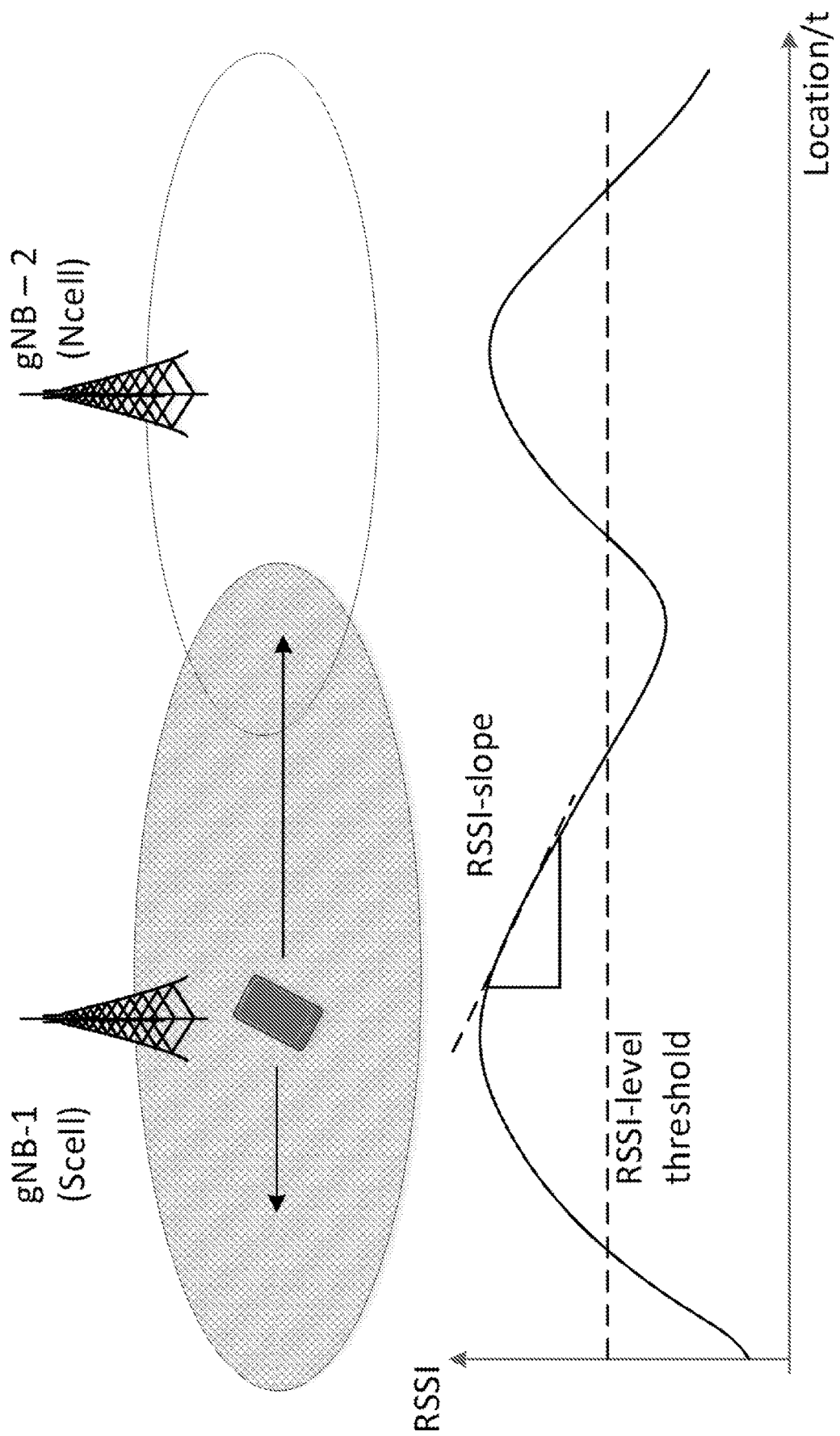
FIG. 7 shows a measurement scenario of a terminal moving under coverage of at least one cell.

FIG. 7 shows a measurement scenario of a terminal moving under coverage of at least one cell and in particular shows an exemplary RSSI level change according to the measured power from different NBs.

As illustrated in FIG. 7, according to example embodiments, the UE is running a local algorithm monitoring the level of the total received power (e.g. RSSI level) in time and compares it against a threshold of the total received power (e.g. RSSI threshold).

When the total received power (e.g. RSSI) value falls below the defined threshold, it may be an indication for the UE that the signal conditions of its serving cell have degraded to an extent which requires applying normal RRM measurement configuration. Similarly, when the total received power value raises while the serving cell RSRP is decreasing it is an indication that one or more strong neighbor cells may have appeared, which requires starting more neighbor cell measurements if they are relaxed.

Alternatively, and/or additionally, according to example embodiments, the total received power (e.g. RSSI) change in time (i.e. slope) is tracked to indicate the change (increase or decrease), indicating that a neighbor cell is getting stronger.

According to example embodiments, this is used as trigger on the UE to do normal RSRP/RSRQ measurements.

The thresholds of the total received power (e.g. RSSI thresholds) [level and/or slope] depend on the UE hardware (HW) as well as software (SW) implementation and can be decided by measurements in controlled laboratory environments, where signal generators and/or TestSets can be connected to the UE as serving cell and one (or more) neighbor cells.

Subsequently, details of the relaxation being a prerequisite for and part of the concepts of example embodiments are discussed.

Namely, the concepts of example embodiments refer to different measurement relaxation "types".

Figure 8:
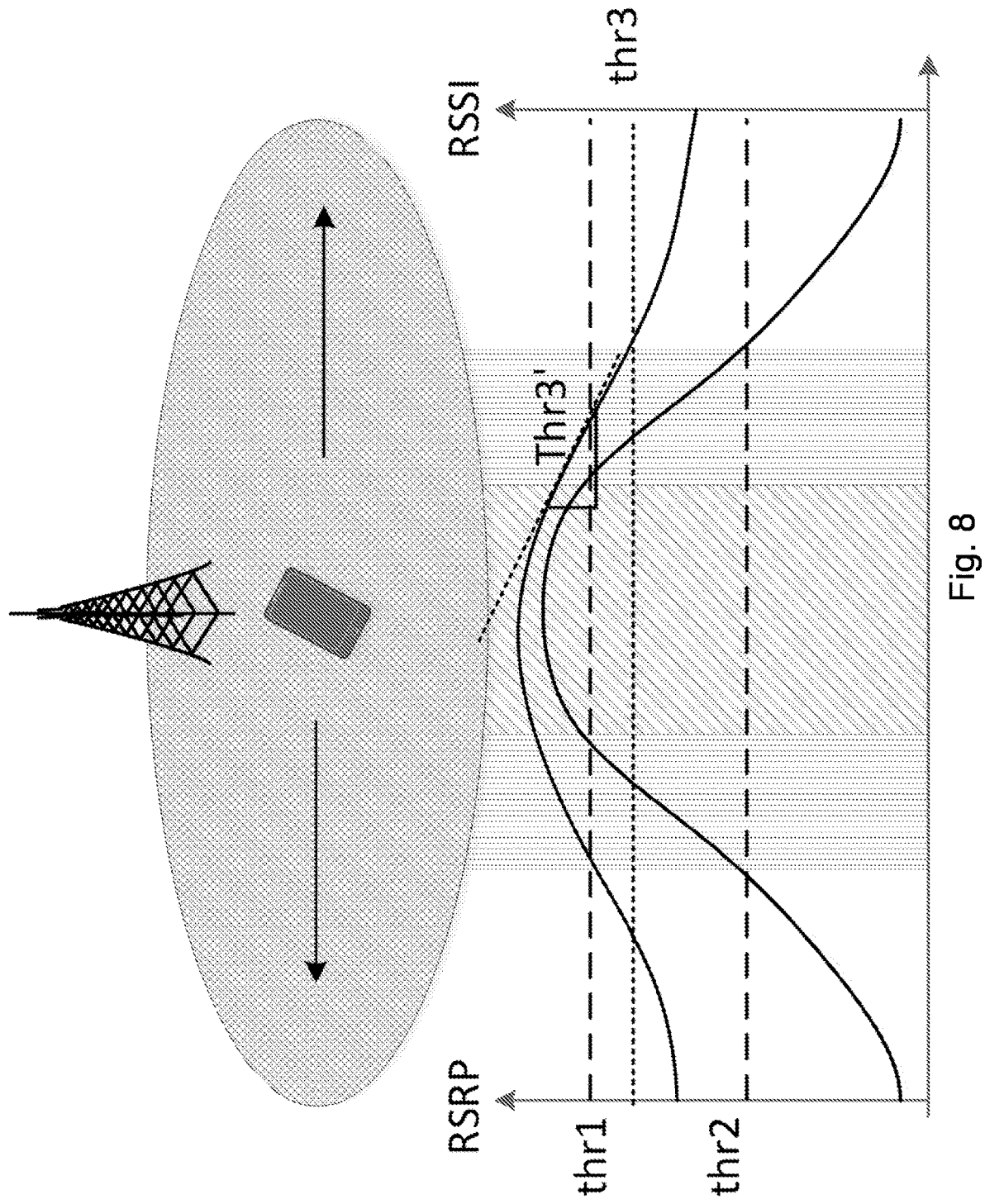
FIG. 8 shows a measurement scenario of a terminal moving under coverage of a cell.

FIG. 8 shows a measurement scenario of a terminal moving under coverage of a cell and in particular shows RSRP and RSSI measures as a function of UE location in its serving cell (i.e. RSRP and total received power (e.g. RSSI) measured level depending on the UE's location toward the NB of its serving cell).

Here, it is assumed that for the UE with high measured serving cell RSRP level (≥thr1 at the cell center) and no/low mobility the UE may lead to a complete relaxation in RRM measurements including the serving cell measurements.

When the UE is in the middle of its serving cell with moderately good RSRP level (≤thr1 and ≥thr2), the UE may relax neighbor cell measurements.

Figure 9:
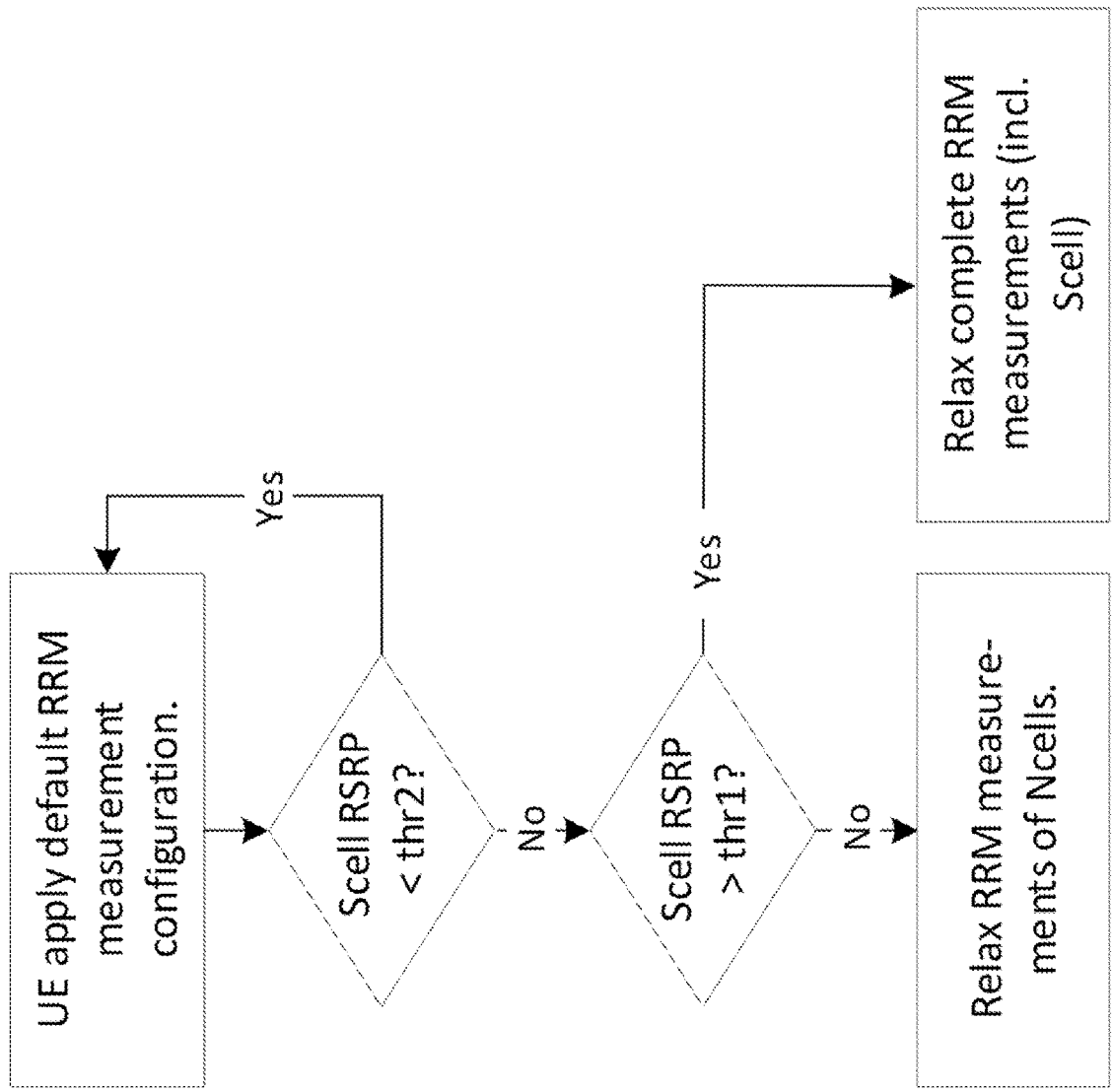
FIG. 9 is a schematic diagram of a procedure allowing RSRP based UE power saving with relaxed RRM measurements.

FIG. 9 is a schematic diagram of a procedure and in particular illustrates the above-outlined flow of RSRP-based UE power saving with relaxed RRM measurements.

Consequently, different types or flavors or degrees of RRM measurement relaxation may be present.

Depending on the applied type of RRM measurement relaxation illustrated above, the total received power (e.g. RSSI) measurements (measurement results) can be used slightly different as discussed below.

Namely, in a first case, the measurements with respect to the serving cell are relaxed too.

For UE at the center of its serving cell (very high RSRP/RSRQ) and low/no mobility, a complete RRM measurement relaxation may have been applied.

This means that the UE has also relaxed measurement on its serving cell.

It should be noted that the relaxation in RRM measurements on the serving cell may not be allowed by the NW for instance according to the 3GPP standard for release 16 or a later release), however, the UE implementation can still apply such relaxation in certain (very good) conditions when it estimates for instance that there is no risk to miss triggering a measurement reporting event (e.g. A3) and if it can meet the measurement accuracy anyway with fewer measurements in RRC connected. Similarly, in RRC idle/inactive such relaxation could be applied if the UE determines no risk of missing a cell reselection decision.

In this first case in which the measurements with respect to the serving cell are relaxed too, a decrease of the total received power (e.g. RSSI) level may indicate that the UE is moving away from the cell center, and according to example embodiments, the UE triggers one or more of the actions below in priority order:

Remove relaxation of serving cell measurement
Remove relaxation of intra-frequency neighbor cell measurement
(Remove relaxation of inter-frequency (and inter-RAT) measurement)

Figure 10:
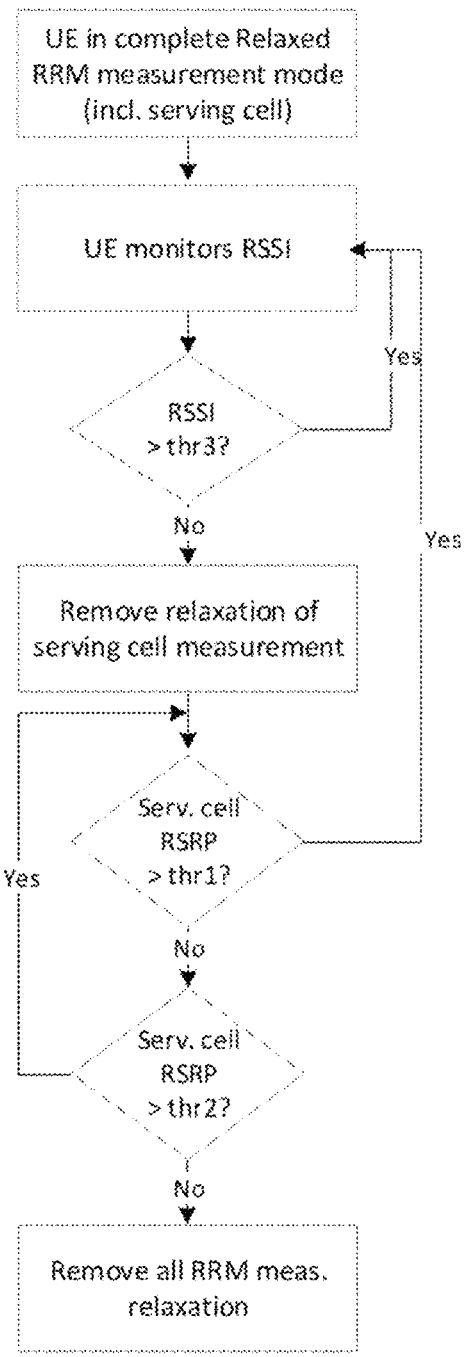
FIG. 10 is a schematic diagram of a procedure according to example embodiments.

FIG. 10 is a schematic diagram of a procedure according to example embodiments and in particular illustrates a process of reverting measurement relaxation back to lower measurement relaxation stages for the first case.

As is illustrated in FIG. 10, if the serving cell RSRP level is still indicating the UE is in the center of the cell ("Serv. cell RSRP>thr1": "Yes"), a decrease of the level of the total received power (e.g. RSSI level) normally leading to a "removal of relaxation of serving cell measurement" may be resulted from interference.

If, on the other hand, the RSRP level (indicative of UE location in the cell, cell center vs cell edge) shows degradation in serving cell ("Serv. cell RSRP>thr1": "No" and "Serv. cell RSRP>thr2": "No"; i.e. at least indicates a UE location necessitating removal of all RRM measurement relaxations), according to example embodiments, the neighbor cells (Ncell) measurement relaxation is also reverted ("removal of all RRM measurement relaxations").

Instead of utilizing the current RSRP level, a progress or change of the RSRP level over time may be considered.

In such case, for detecting degradation, the UE compares the serving cell RSRP in time. In particular, degradation is detected in case Serv. cell RSRP(t2)<Serv. cell RSRP(t1) under the assumption that t2>t1.

Depending on the chosen UE implementation, according to example embodiments, the step "removal of all RRM measurement relaxations" can potentially run in smaller steps with removing intra-frequency Ncell measurement relaxation first and only remove relaxation for inter-frequency and inter-RAT measurements in a further step.

The threshold of the total received power (e.g. RSSI threshold) level (thr3) may be determined/decided/optimized in controlled laboratory environments as the value at which the UE may risk to go out-of-sync with a sudden decrease in its serving cell with complete relaxed RRM measurements plus a margin of 2-3 dB to be decided based on the UE implementation.

Further, in a second case, for a UE somewhere in between the serving cell center and the edge, or in any RRC state with no serving cell relaxation implemented, the RRM relaxation may have been applied to neighbor cells only.

In this second case, the RSRP measurements on the serving cell are still being performed and therefore available according to the standard defined measurement requirements.

Hence, according to example embodiments, the total received power (e.g. RSSI) measurement changes can be evaluated in combination with the RSRP changes from the serving cell.

The primary gain in this second case is when the serving cell is still high but strong neighbor cells are getting visible at the UE, or when very high total received power (e.g. RSSI) slope indicates fast changing channel condition. A change in RSSI may particularly indicate an increase of the level of intra-frequency neighbor cells.

According to example embodiments, the total received power (e.g. RSSI) parameter indicator in this second case can be a slope (i.e. the slope of its variation in time) rather than a value. A higher slope indicates a faster variation in time.

Thus, according to example embodiments, the total received power (e.g. RSSI) change is evaluated in combination with the serving cell RSRP to decide the appropriate action as listed below.

If the Serving cell RSRP is (substantially) unchanged, and
  the total received power (e.g. RSSI) is decreasing: No need for neighbor measurements.
  the total received power (e.g. RSSI) is increasing: This indicates that potential strong neighbors are appearing; hence, neighbor RSRP is added to see if it was noise/interference or maybe a good neighbor.
If the Serving cell RSRP is decreased, and
  the total received power (e.g. RSSI) is decreasing: Serving cell reduction alone triggers reverting Ncell measurement relaxation.
  the total received power (e.g. RSSI) is increasing: This indicates potential stronger neighbor cells are appearing; hence, neighbor cell RSRP measurement is restarted if earlier relaxed to see if the increase in RSSI was due to noise/interference or to a stronger neighbor cell.
If the Serving cell RSRP is increased, and
  the total received power (e.g. RSSI) is decreasing: No need for neighbor measurements.
  the total received power (e.g. RSSI) is increasing: No need for neighbor measurements.

Figure 11:
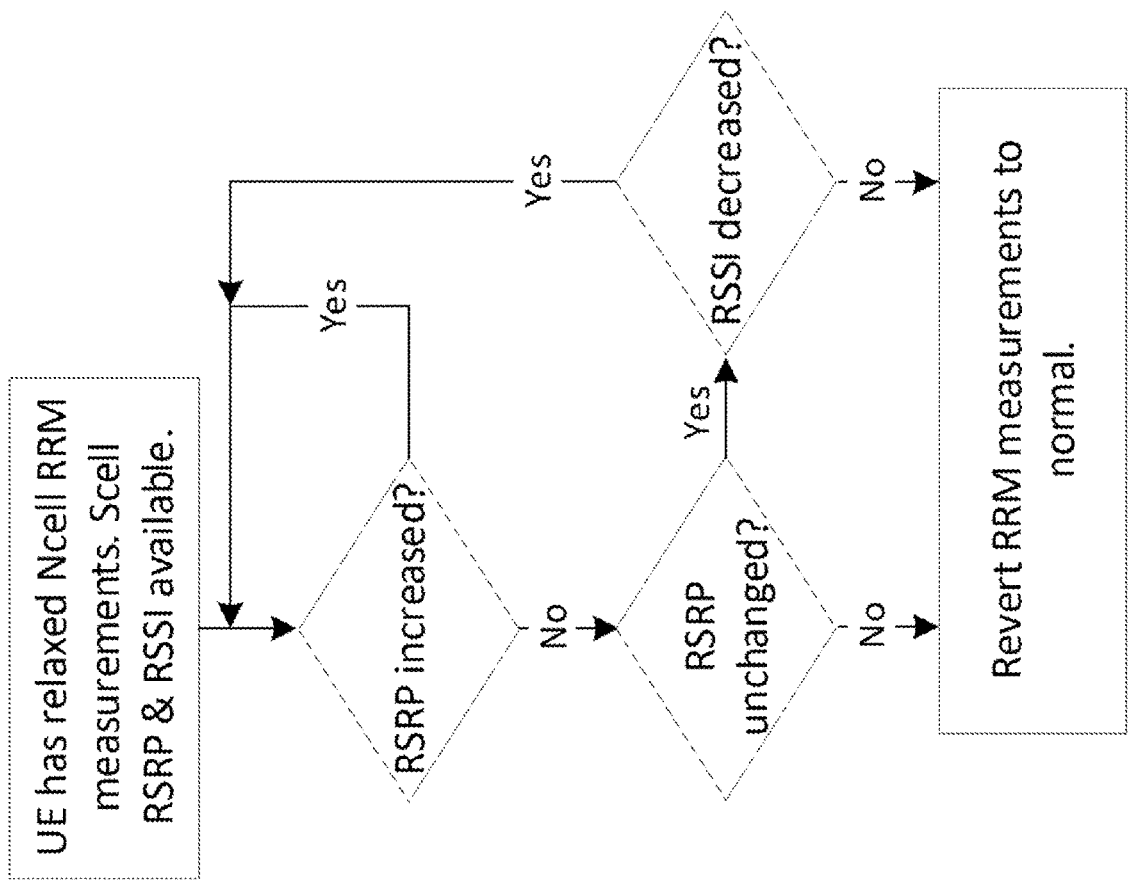
FIG. 11 is a schematic diagram of a procedure according to example embodiments.

FIG. 11 is a schematic diagram of a procedure according to example embodiments and in particular illustrates a process of reverting measurement relaxation back to a lower measurement relaxation stage for the second case as already outlined above.

In particular, when the RSRP is decreased, according to example embodiments, the corresponding serving cell RSRP triggered power saving exit will follow even without evaluating the total received power (e.g. RSSI).

The total received power (e.g. RSSI) can, however, still be used to adopt the implementation on the granularity the steps.

In particular, similar to the first case, according to example embodiments, the Ncell measurements relaxation is removed in two steps, e.g. intra-frequency measurement relaxation removed at first and the inter-frequency and inter-RAT measurement relaxation removed in a further step.

The threshold of the total received power (e.g. RSSI threshold) level (thr3) and/or slope (thr3') may be determined/decided/optimized in controlled laboratory environments as the value at which the UE may risk to go out-of-sync with a sudden increase in its neighbor cell with relaxed neighbor cell RRM measurements plus a margin of 2-3 dB to be decided based on the UE implementation.

As is explained above, exemplary embodiments directed to the second case utilize the total received power (e.g. RSSI) only as supplementary measure to the serving cell RSRP measurements.

It is noted that the accuracy of the proposed total received power (e.g. RSSI) indicator may depend on the reception activity performed by the UE. In RRC connected, the reception activity may be connected also to user plane data transfer and therefore may be higher. In RRC idle/inactive, the UE reception will be according to the paging monitoring and thus will be lower.

The times where data transfer happen may be more critical, because if RLF happens in conjunction with a data burst, there will be QoS penalty.

Figure 12:
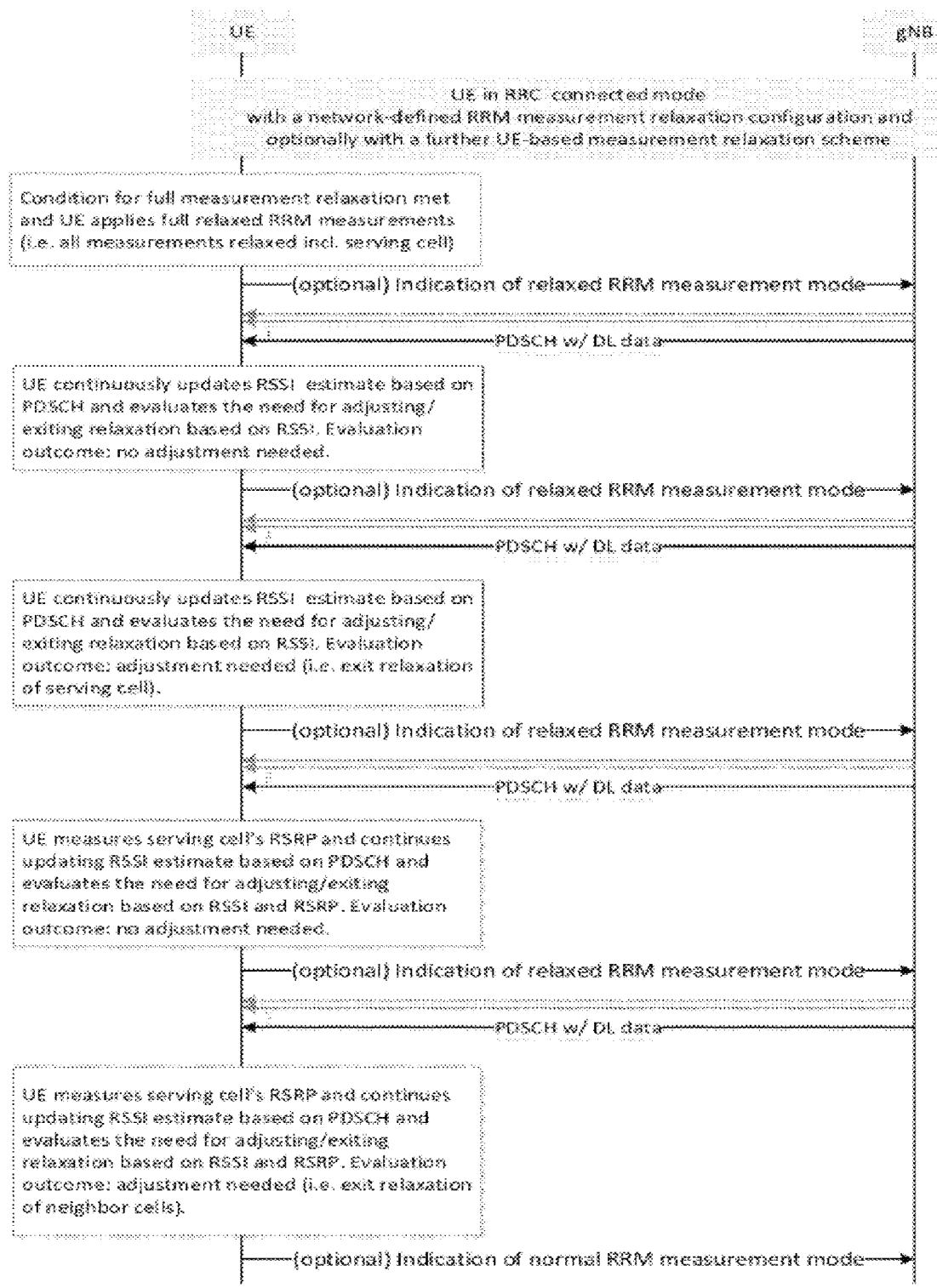
FIG. 12 shows a schematic diagram of signaling and decision sequences according to example embodiments.

FIG. 12 shows a schematic diagram of signaling and decision sequences according to example embodiments with a considered UE being in RRC_connected mode.

Figure 13:
FIG. 13 shows a schematic diagram of signaling and decision sequences according to example embodiments.

FIG. 13 shows a schematic diagram of signaling and decision sequences according to example embodiments with a considered UE being in RRC_idle/inactive mode.

Basic assumptions and principles valid for both FIGS. 12 and 13 are summarized below, before the flow of each of the Figures is described in detail.

In particular, at any state the UE has information about one or more RRM measurement relaxation mode(s) from the network (as part of SIB, RRC_release or RRC_configuration). This includes different relaxation modes/levels as well as corresponding conditions/triggers for each.

Optionally, the UE may have added further RRM measurement relaxation based on the UE-implementation.

Depending on a met condition, according to example embodiments, the UE may apply RRM relaxation.

The following definitions are set for the description of the flow according to any of FIGS. 12 and 13.

Firstly, a "complete relaxation" means relaxing RRM measurement for neighbor cells as well as the serving/camping cell.

Further, a "partial relaxation" means relaxing RRM measurements only for neighbor cells.

Furthermore, "no relaxation" means performing all configured/informed RRM measurements.

Under the assumption that the UE is in complete relaxed mode, i.e. the UE has relaxed RRM measurements for both neighbor cells' and serving/camping cell's after meeting the corresponding conditions, according to example embodiments, the UE will still make RSSI estimation based on its received signal(s) (PDSCH data in RRC_connected and PDCCH/control in RRC_idle/inactive).

If the UE is in complete relaxed mode, an RSSI-based evaluation may be used by UE to stay in the "complete relaxation" or to exit the "complete relaxation" and to move to "partial relaxation".

On the other hand, under the assumption that the UE is in partially relaxed mode, i.e. the UE has relaxed RRM measurements for neighbor cells' only, according to example embodiments, the UE will still make RSSI estimation based on its received signal(s) (PDSCH data in RRC_connected and PDCCH/control in RRC_idle/inactive) together with the RSRP/RSRQ measurements for the serving/camping cell.

If the UE is in partially relaxed mode, an RSSI—RSRP based evaluation may be used by UE to stay in the "partial relaxation" or to exit the "partial relaxation" and to move to normal RRM measurements ("no relaxation").

In detail, as is derivable from FIG. 12, the considered UE in RRC_connected mode may be configured with a network defined RRM measurement relaxation configuration.

A further UE based measurement relaxation scheme may additionally be configured.

In case the condition(s) for full measurement relaxation are fulfilled, the UE may apply full relaxed RRM measurements, i.e., all measurements (incl. serving cell) are relaxed.

The UE may indicate the relaxed measurement mode to the serving cell.

The UE continuously updates the RSSI estimate based on the received PDSCH. Further, the UE evaluates the need for adjusting/exiting relaxation based on the continuously updated RSSI estimate.

If the evaluation result reveals that no adjustment is needed, the UE further continuously updates the RSSI estimate and performs the evaluation based on the continuously updated RSSI estimate.

As long as in any measurement relaxation state, according to example embodiments, the UE may (repetitively) indicate the relaxed measurement mode to the serving cell.

If the evaluation result reveals that an adjustment is needed, according to example embodiments, the UE performs the respective adjustment measure.

As an example, the UE may exit the relaxation of the serving cell.

Once the relaxation of the serving cell is exited, the UE measures the serving cell's RSRP and further continuously updates the RSSI estimate based on the received PDSCH. Further, the UE evaluates the need for adjusting/exiting relaxation based on RSSI estimate and the RSRP.

If the evaluation result reveals that no adjustment is needed, the UE further measures the serving cell's RSRP and further continuously updates the RSSI estimate and performs the evaluation based on the continuously updated RSSI estimate and the RSRP.

If the evaluation result reveals that an adjustment is needed, according to example embodiments, the UE performs the respective (further) adjustment measure.

As an example, the UE may exit the relaxation of the neighbor cells.

Once the relaxation of the neighbor cells is exited, the UE may indicate the normal measurement mode to the serving cell.

Further, as is derivable from FIG. 13, the considered UE in RRC_idle/inactive mode may be configured with a network defined RRM measurement relaxation information.

A further UE based measurement relaxation scheme may additionally be configured.

In case the condition(s) for full measurement relaxation are fulfilled, the UE may apply full relaxed RRM measurements, i.e., all measurements (incl. serving cell) are relaxed.

The UE continuously updates the RSSI estimate based on the received PDSCH/control channels. Further, the UE evaluates the need for adjusting/exiting relaxation based on the continuously updated RSSI estimate.

If the evaluation result reveals that no adjustment is needed, the UE further continuously updates the RSSI estimate and performs the evaluation based on the continuously updated RSSI estimate.

If the evaluation result reveals that an adjustment is needed, according to example embodiments, the UE performs the respective adjustment measure.

As an example, the UE may exit the relaxation of the serving cell.

Once the relaxation of the serving cell is exited, the UE measures the serving cell's RSRP and further continuously updates the RSSI estimate based on the received PDSCH/control channels. Further, the UE evaluates the need for adjusting/exiting relaxation based on RSSI estimate and the RSRP.

If the evaluation result reveals that no adjustment is needed, the UE further measures the serving cell's RSRP and further continuously updates the RSSI estimate and performs the evaluation based on the continuously updated RSSI estimate and the RSRP.

If the evaluation result reveals that an adjustment is needed, according to example embodiments, the UE performs the respective (further) adjustment measure.

As an example, the UE may exit the relaxation of the neighbor cells.

As follows from the above explanation, according to example embodiments, the UE can have benefit of power saving by relaxing RSRP measurements—even on serving cell—and still be capable to evaluate fast changes in the channel and revert the relaxed measurements and be able to avoid loss of coverage (in RRC_idle/RRC_inactive modes) by e.g. cell reselection to identified neighbor cell or RLF (in RRC_connected mode) by e.g. HO to identified strong neighbor cell.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 14:
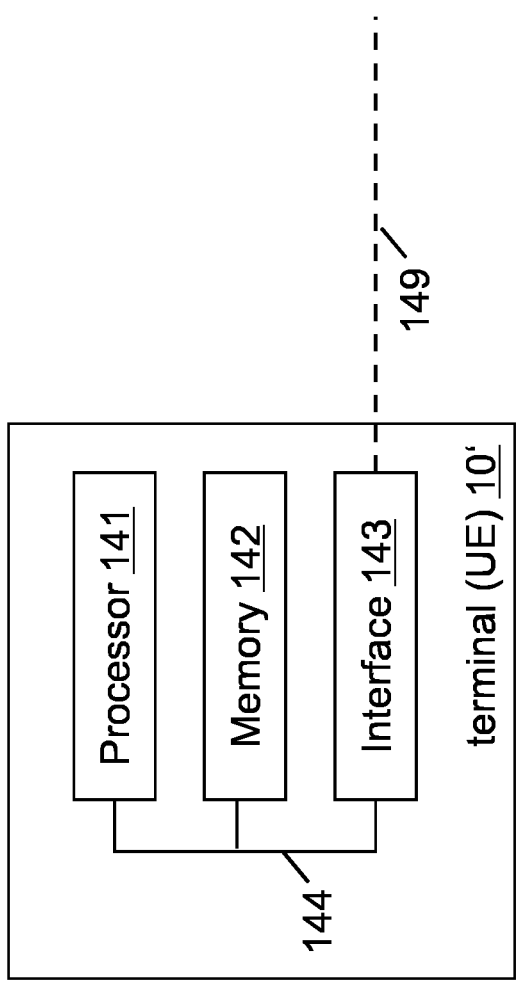
FIG. 14 is a block diagram alternatively illustrating an apparatus according to example embodiments.

In FIG. 14, an alternative illustration of apparatuses according to example embodiments is depicted. As indicated in FIG. 14, according to example embodiments, the apparatus (terminal) 10' (corresponding to the terminal 10)

comprises a processor 141, a memory 142 and an interface 143, which are connected by a bus 144 or the like, and the apparatus may be connected to other apparatuses via link 149.

The processor 141 and/or the interface 143 may also include a modem or the like to facilitate communication over a (hardwire or wireless) link, respectively. The interface 143 may include a suitable transceiver coupled to one or more antennas or communication means for (hardwire or wireless) communications with the linked or connected device(s), respectively. The interface 143 is generally configured to communicate with at least one other apparatus, i.e. the interface thereof.

The memory 142 may store respective programs assumed to include program instructions or computer program code that, when executed by the respective processor, enables the respective electronic device or apparatus to operate in accordance with the example embodiments.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the terminal 10 (in a radio resource management measurements relaxation mode having a reduced radio resource management measurements activity within a first relaxation mode scope as a relaxation mode scope of said radio resource management measurements relaxation mode, the terminal being served by a radio cell in a frequency band) comprises at least one processor 141, at least one memory 142 including computer program code, and at least one interface 143 configured for communication with at least another apparatus.

The processor (i.e. the at least one processor 141, with the at least one memory 142 and the computer program code) is configured to perform achieving information on a parameter indicative of a total power received by said terminal at said frequency band (thus the apparatus comprising corresponding means for achieving), and to perform deciding on a change of said relaxation mode scope of said radio resource management measurements relaxation mode based on said information on said parameter indicative of said total power received by said terminal at said frequency band (thus the apparatus comprising corresponding means for deciding).

For further details regarding the operability/functionality of the apparatus, reference is made to the above description in connection with any one of FIGS. 1 to 13, respectively.

For the purpose of example embodiments as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of example embodiments. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

Example embodiments also cover any conceivable combination of method steps and operations described above, and any conceivable combination of nodes, apparatuses, modules or elements described above, as long as the above-described concepts of methodology and structural arrangement are applicable.

In view of the above, there are provided measures for measurement relaxation change based on the total received power, in particular on an indicator of the total received power. Such measures exemplarily comprise, at a terminal in a radio resource management measurements relaxation mode having a reduced radio resource management measurements activity within a first relaxation mode scope as a relaxation mode scope of said radio resource management measurements relaxation mode, the terminal being served by a radio cell in a frequency band, achieving information on a parameter indicative of a total power received by said terminal at said frequency band, and deciding on a change of said relaxation mode scope of said radio resource management measurements relaxation mode based on said information on said parameter indicative of said total power received by said terminal at said frequency band.

Even though the invention is described above with reference to the examples according to the accompanying drawings, it is to be understood that the invention is not restricted thereto. Rather, it is apparent to those skilled in the art that example embodiments can be modified in many ways without departing from the scope of the inventive idea as disclosed herein.

EXAMPLES

Example 1. A method of a terminal in a radio resource management measurements relaxation mode having a reduced radio resource management measurements activity within a first relaxation mode scope as a relaxation mode scope of said radio resource management measurements relaxation mode, the terminal being served by a radio cell in a frequency band, the method comprising
    achieving information on a parameter indicative of a total power received by said terminal at said frequency band, and
    deciding on a change of said relaxation mode scope of said radio resource management measurements relaxation mode based on said information on said parameter indicative of said total power received by said terminal at said frequency band.

Example 2. The method according to Example 1, wherein in relation to said deciding, the method further comprises
    examining whether said information on said parameter indicative of said total power received by said terminal at said frequency band is indicative of exceeding a predetermined radio condition deterioration with respect to said radio connection of said terminal, and
    determining, if said information on said parameter indicative of said total power received by said terminal at said frequency band is indicative of exceeding said predetermined radio condition deterioration with respect to said radio connection of said terminal, to decrease said relaxation mode scope of said radio resource management measurements relaxation mode.

Example 3. The method according to Example 1 or 2, wherein
    said terminal is in any of a radio resource control connected state, a radio resource control idle state, and a radio resource control inactive state.

Example 4. The method according to any of Examples 1 to 3, wherein
    said first relaxation mode scope includes radio resource management measurements with respect to a serving cell of said terminal, radio resource management measurements with respect to intra-frequency neighbor cells of said terminal, inter-frequency radio resource management measurements, and inter-radio-access-technology radio resource management measurements.

Example 5. The method according to Example 4, further comprising
    removing, if said information on said parameter indicative of said total power received by said terminal at said frequency band is smaller than a total received power threshold, said radio resource management measurements with respect to said serving cell of said terminal from said relaxation mode scope of said radio resource management measurements relaxation mode.

Example 6. The method according to Example 5, further comprising
    adding, if a reference signal received power with respect to said serving cell of said terminal acquired by said radio resource management measurements with respect to said serving cell of said terminal is equal to or larger than a first reference signal received power threshold, said radio resource management measurements with respect to said serving cell of said terminal to said relaxation mode scope of said radio resource management measurements relaxation mode.

Example 7. The method according to Example 4, wherein in relation to said deciding, the method further comprises
    modifying a measurement periodicity of a reference signal received power with respect to said serving cell of said terminal acquired by said radio resource management measurements with respect to said serving cell of said terminal based on said information on said parameter indicative of said total power received by said terminal at said frequency band.

Example 8. The method according to Example 7, wherein
said terminal undergoes discontinuous reception defined by a discontinuous reception cycle,
said reference signal received power with respect to said serving cell of said terminal is acquired by said radio resource management measurements with respect to said serving cell of said terminal at every $N^{th}$ discontinuous reception cycle, where a periodicity control value N is an integer value, and
in relation to said modifying, the method further comprises
    setting said periodicity control value N based on said information on said parameter indicative of said total power received by said terminal at said frequency band.

Example 9. The method according to any of Examples 1 to 3, wherein
    said first relaxation mode scope includes radio resource management measurements with respect to intra-frequency neighbor cells of said terminal, inter-frequency radio resource management measurements, and interradio-access-technology radio resource management measurements and excludes radio resource management measurements with respect to a serving cell of said terminal.

Example 10. The method according to any of Examples 1 to 3, wherein
in relation to said deciding, the method further comprises controlling radio resource management measurements relaxation with respect to neighbor cells of said terminal based on
a reference signal received power with respect to said serving cell of said terminal acquired by said radio resource management measurements with respect to said serving cell of said terminal, and
said information on said parameter indicative of said total power received by said terminal at said frequency band.

Example 11. The method according to Example 9, further comprising
removing, if a reference signal received power with respect to said serving cell of said terminal acquired by said radio resource management measurements with respect to said serving cell of said terminal is identified as being substantially unchanged with respect to a first preceding measurement or an average value of a first predetermined number of first preceding measurements and said information on said parameter indicative of said total power received by said terminal at said frequency band is identified as being increased with respect to a second preceding measurement or an average value of a second predetermined number of second preceding measurements, said radio resource management measurements with respect to said intra-frequency neighbor cells of said terminal from said relaxation mode scope of said radio resource management measurements relaxation mode.

Example 12. The method according to Example 11, further comprising
removing, if said reference signal received power with respect to said serving cell of said terminal acquired by said radio resource management measurements with respect to said serving cell of said terminal is identified as being substantially unchanged with respect to said first preceding measurement or said average value of said first predetermined number of first preceding measurements and said information on said parameter indicative of said total power received by said terminal at said frequency band is identified as being increased with respect to said second preceding measurement or said average value of second first predetermined number of second preceding measurements, said inter-frequency radio resource management measurements and said inter-radio-access-technology radio resource management measurements from said relaxation mode scope of said radio resource management measurements relaxation mode.

Example 13. The method according to Example 11 or 12, further comprising
removing, if said reference signal received power with respect to said serving cell of said terminal acquired by said radio resource management measurements with respect to said serving cell of said terminal is identified as being decreased with respect to said first preceding measurement or said average value of said first predetermined number of first preceding measurements, said radio resource management measurements with respect to said intra-frequency neighbor cells of said terminal from said relaxation mode scope of said radio resource management measurements relaxation mode.

Example 14. The method according to any of Examples 11 to 13, further comprising
removing, if said reference signal received power with respect to said serving cell of said terminal acquired by said radio resource management measurements with respect to said serving cell of said terminal is identified as being decreased with respect to said first preceding measurement or said average value of said first predetermined number of first preceding measurements, said inter-frequency radio resource management measurements and said inter-radio-access-technology radio resource management measurements from said relaxation mode scope of said radio resource management measurements relaxation mode.

Example 15. The method according to any of Examples 1 to 14, wherein
said information on said parameter indicative of said total power received by said terminal at said frequency band is a value of a total received power indicator, or
said information on said parameter indicative of said total power received by said terminal at said frequency band is a change of said total received power indicator per unit time.

Example 16. The method according to Example 15, wherein
said total received power indicator is calculated for automatic gain control processing.

Example 17. An apparatus of a terminal in a radio resource management measurements relaxation mode having a reduced radio resource management measurements activity within a first relaxation mode scope as a relaxation mode scope of said radio resource management measurements relaxation mode, the terminal being served by a radio cell in a frequency band, the apparatus comprising
achieving circuitry configured to achieve information on a parameter indicative of a total power received by said terminal at said frequency band, and
deciding circuitry configured to decide on a change of said relaxation mode scope of said radio resource management measurements relaxation mode based on said information on said parameter indicative of said total power received by said terminal at said frequency band.

Example 18. The apparatus according to Example 17, further comprising
examining circuitry configured to examine whether said information on said parameter indicative of said total power received by said terminal at said frequency band is indicative of exceeding a predetermined radio condition deterioration with respect to said radio connection of said terminal, and
determining circuitry configured to determine, if said information on said parameter indicative of said total power received by said terminal at said frequency band is indicative of exceeding said predetermined radio condition deterioration with respect to said radio connection of said terminal, to decrease said relaxation mode scope of said radio resource management measurements relaxation mode.

Example 19. The apparatus according to Example 17 or 18, wherein
said terminal is in any of a radio resource control connected state, a radio resource control idle state, and a radio resource control inactive state.

Example 20. The apparatus according to any of Examples 17 to 19, wherein
  said first relaxation mode scope includes radio resource management measurements with respect to a serving cell of said terminal, radio resource management measurements with respect to intra-frequency neighbor cells of said terminal, inter-frequency radio resource management measurements, and inter-radio-access-technology radio resource management measurements.

Example 21. The apparatus according to Example 20, further comprising
  removing circuitry configured to remove, if said information on said parameter indicative of said total power received by said terminal at said frequency band is smaller than a total received power threshold, said radio resource management measurements with respect to said serving cell of said terminal from said relaxation mode scope of said radio resource management measurements relaxation mode.

Example 22. The apparatus according to Example 21, further comprising
  adding circuitry configured to add, if a reference signal received power with respect to said serving cell of said terminal acquired by said radio resource management measurements with respect to said serving cell of said terminal is equal to or larger than a first reference signal received power threshold, said radio resource management measurements with respect to said serving cell of said terminal to said relaxation mode scope of said radio resource management measurements relaxation mode.

Example 23. The apparatus according to Example 20, further comprising
  modifying circuitry configured to modify a measurement periodicity of a reference signal received power with respect to said serving cell of said terminal acquired by said radio resource management measurements with respect to said serving cell of said terminal based on said information on said parameter indicative of said total power received by said terminal at said frequency band.

Example 24. The apparatus according to Example 23, wherein
  said terminal undergoes discontinuous reception defined by a discontinuous reception cycle, and
  said reference signal received power with respect to said serving cell of said terminal is acquired by said radio resource management measurements with respect to said serving cell of said terminal at every $N^{th}$ discontinuous reception cycle, where a periodicity control value N is an integer value, wherein
  the apparatus further comprises
  setting circuitry configured to set said periodicity control value N based on said information on said parameter indicative of said total power received by said terminal at said frequency band.

Example 25. The apparatus according to any of Examples 17 to 19, wherein
  said first relaxation mode scope includes radio resource management measurements with respect to intra-frequency neighbor cells of said terminal, inter-frequency radio resource management measurements, and inter-radio-access-technology radio resource management measurements and excludes radio resource management measurements with respect to a serving cell of said terminal.

Example 26. The apparatus according to any of Examples 17 to 19, further comprising
  controlling circuitry configured to control radio resource management measurements relaxation with respect to neighbor cells of said terminal based on
    a reference signal received power with respect to said serving cell of said terminal acquired by said radio resource management measurements with respect to said serving cell of said terminal, and
    said information on said parameter indicative of said total power received by said terminal at said frequency band.

Example 27. The apparatus according to Example 25, further comprising
  removing circuitry configured to remove, if a reference signal received power with respect to said serving cell of said terminal acquired by said radio resource management measurements with respect to said serving cell of said terminal is identified as being substantially unchanged with respect to a first preceding measurement or an average value of a first predetermined number of first preceding measurements and said information on said parameter indicative of said total power received by said terminal at said frequency band is identified as being increased with respect to a second preceding measurement or an average value of a second predetermined number of second preceding measurements, said radio resource management measurements with respect to said intra-frequency neighbor cells of said terminal from said relaxation mode scope of said radio resource management measurements relaxation mode.

Example 28. The apparatus according to Example 27, wherein
  said removing circuitry is further configured to remove, if said reference signal received power with respect to said serving cell of said terminal acquired by said radio resource management measurements with respect to said serving cell of said terminal is identified as being substantially unchanged with respect to said first preceding measurement or said average value of said first predetermined number of first preceding measurements and said information on said parameter indicative of said total power received by said terminal at said frequency band is identified as being increased with respect to said second preceding measurement or said average value of second first predetermined number of second preceding measurements, said inter-frequency radio resource management measurements and said inter-radio-access-technology radio resource management measurements from said relaxation mode scope of said radio resource management measurements relaxation mode.

Example 29. The apparatus according to Example 27 or 28, wherein
  said removing circuitry is further configured to remove, if said reference signal received power with respect to said serving cell of said terminal acquired by said radio resource management measurements with respect to said serving cell of said terminal is identified as being decreased with respect to said first preceding measurement or said average value of said first predetermined number of first preceding measurements, said radio resource management measurements with respect to said intra-frequency neighbor cells of said terminal from said relaxation mode scope of said radio resource management measurements relaxation mode.

Example 30. The apparatus according to any of Examples 27 to 29, wherein
said removing circuitry is further configured to remove, if said reference signal received power with respect to said serving cell of said terminal acquired by said radio resource management measurements with respect to said serving cell of said terminal is identified as being decreased with respect to said first preceding measurement or said average value of said first predetermined number of first preceding measurements, said inter-frequency radio resource management measurements and said inter-radio-access-technology radio resource management measurements from said relaxation mode scope of said radio resource management measurements relaxation mode.

Example 31. The apparatus according to any of Examples 17 to 30, wherein
said information on said parameter indicative of said total power received by said terminal at said frequency band is a value of a total received power indicator, or
said information on said parameter indicative of said total power received by said terminal at said frequency band is a change of said total received power indicator per unit time.

Example 32. The apparatus according to Example 31, wherein
said total received power indicator is calculated for automatic gain control processing.

Example 33. An apparatus of a terminal in a radio resource management measurements relaxation mode having a reduced radio resource management measurements activity within a first relaxation mode scope as a relaxation mode scope of said radio resource management measurements relaxation mode, the terminal being served by a radio cell in a frequency band, the apparatus comprising
at least one processor,
at least one memory including computer program code, and
at least one interface configured for communication with at least another apparatus,
the at least one processor, with the at least one memory and the computer program code, being configured to cause the apparatus to perform:
achieving information on a parameter indicative of a total power received by said terminal at said frequency band, and
deciding on a change of said relaxation mode scope of said radio resource management measurements relaxation mode based on said information on said parameter indicative of said total power received by said terminal at said frequency band.

Example 34. A computer program product comprising computer-executable computer program code which, when the program is run on a computer, is configured to cause the computer to carry out the method according to any one of Examples 1 to 16.

Example 35. The computer program product according to Example 34, wherein the computer program product comprises a computer-readable medium on which the computer-executable computer program code is stored, and/or wherein the program is directly loadable into an internal memory of the computer or a processor thereof.

LIST OF ACRONYMS AND ABBREVIATIONS

3GPP 3rd Generation Partnership Project
AGC automatic gain control
DL downlink
DRX discontinuous reception
DSP digital signal processor
HO handover
HW hardware
NB NodeB
NW network
OFDM orthogonal frequency division multiplex[ing]
QoS quality of service
RAT radio access technology)
RLF radio link failure
RRC radio resource control
RRM radio resource management
RSRP reference signal received power
RSRQ reference signal received quality
RSSI received signal strength indicator
RX reception
SMTC SS/PBCH block measurement time configuration
SSB synchronization signal block
SS/PBCH synchronization signal/physical broadcast channel
SW software
UE user equipment
UL uplink

The invention claimed is:

1. A method comprising:
performing by a terminal in a radio resource management measurements relaxation mode having a reduced radio resource management measurements activity within a first relaxation mode scope as a relaxation mode scope of said radio resource management measurements relaxation mode, the terminal being served with a radio cell in a frequency band:
achieving information on a parameter indicative of a total power received by said terminal at said frequency band, and
deciding on a change of said relaxation mode scope of said radio resource management measurements relaxation mode based on said information on said parameter indicative of said total power received by said terminal at said frequency band,
wherein said first relaxation mode scope includes radio resource management measurements with respect to intra-frequency neighbor cells of said terminal, inter-frequency radio resource management measurements, or inter-radio-access-technology radio resource management measurements, and
wherein the said first relaxation mode is performed in RRC INACTIVE, RRC_IDLE and RRC_Connected.

2. The method according to claim 1, wherein in relation to said deciding, the method further comprises:
examining whether said information on said parameter indicative of said total power received by said terminal at said frequency band is indicative of exceeding a predetermined radio condition deterioration with respect to said radio connection of said terminal, and
determining, when said information on said parameter indicative of said total power received by said terminal at said frequency band is indicative of exceeding said predetermined radio condition deterioration with respect to said radio connection of said terminal, to decrease said relaxation mode scope of said radio resource management measurements relaxation mode.

3. The method according to claim 1, wherein said first relaxation mode scope includes radio resource management measurements with respect to a serving cell of said terminal, radio resource management measurements with respect to intra-frequency neighbor cells of said terminal, inter-frequency radio resource management measurements, and inter-radio-access-technology radio resource management measurements.

4. The method according to claim 3, further comprising:
removing, when said information on said parameter indicative of said total power received by said terminal at said frequency band is smaller than a total received power threshold, said radio resource management measurements with respect to said serving cell of said terminal from said relaxation mode scope of said radio resource management measurements relaxation mode.

5. The method according to claim 4, further comprising:
adding, when a reference signal received power with respect to said serving cell of said terminal acquired with said radio resource management measurements with respect to said serving cell of said terminal is equal to or larger than a first reference signal received power threshold, said radio resource management measurements with respect to said serving cell of said terminal to said relaxation mode scope of said radio resource management measurements relaxation mode.

6. The method according to claim 1, wherein in relation to said deciding, the method further comprises:
controlling radio resource management measurements relaxation with respect to
neighbor cells of said terminal based on a reference signal received power with respect to said serving cell of said terminal acquired with said radio resource management measurements with respect to said serving cell of said terminal, and said information on said parameter indicative of said total power received by said terminal at said frequency band.

7. The method according to claim 1, wherein:
said information on said parameter indicative of said total power received by said terminal at said frequency band is a value of a total received power indicator, or
said information on said parameter indicative of said total power received by said terminal at said frequency band is a change of said total received power indicator per unit time.

8. A non-transitory program storage device readable by a machine, tangibly embodying a program of instructions executable by the machine for performing operations, the operations comprising the method as claimed in claim 1.

9. An apparatus
at least one processor; and
at least one memory storing instructions, that when executed by the at least one processor, cause the apparatus at least to:
perform with a terminal in a radio resource management measurements relaxation mode having a reduced radio resource management measurements activity within a first relaxation mode scope as a relaxation mode scope of said radio resource management measurements relaxation mode, the terminal being served with a radio cell in a frequency band, operations comprising:
achieving circuitry configured to achieve information on a parameter indicative of a total power received by said terminal at said frequency band, and
deciding circuitry configured to decide on a change of said relaxation mode scope of said radio resource management measurements relaxation mode based on said information on said parameter indicative of said total power received by said terminal at said frequency band, wherein said first relaxation mode scope includes radio resource management measurements with respect to intra-frequency neighbor cells of said terminal, inter-frequency radio resource management measurements, or inter-radio-access-technology radio resource management measurements, and
wherein the said first relaxation mode is performed in RRC_INACTIVE, RRC_IDLE and RRC_Connected.

10. The apparatus according to claim 9, wherein the at least one memory is storing instructions, that when executed by the at least one processor, cause the apparatus to perform:
examining circuitry configured to examine whether said information on said parameter indicative of said total power received by said terminal at said frequency band is indicative of exceeding a predetermined radio condition deterioration with respect to said radio connection of said terminal, and
determining circuitry configured to determine, when said information on said parameter indicative of said total power received by said terminal at said frequency band is indicative of exceeding said predetermined radio condition deterioration with respect to said radio connection of said terminal, to decrease said relaxation mode scope of said radio resource management measurements relaxation mode.

11. The apparatus according to claim 9, wherein said first relaxation mode scope includes radio resource management measurements with respect to a serving cell of said terminal, radio resource management measurements with respect to intra-frequency neighbor cells of said terminal, inter-frequency radio resource management measurements, and inter-radio-access-technology radio resource management measurements.

12. The apparatus according to claim 11, wherein the at least one memory is storing instructions, that when executed by the at least one processor, cause the apparatus to perform:
removing circuitry configured to remove, when said information on said parameter indicative of said total power received by said terminal at said frequency band is smaller than a total received power threshold, said radio resource management measurements with respect to said serving cell of said terminal from said relaxation mode scope of said radio resource management measurements relaxation mode.

13. The apparatus according to claim 12, wherein the at least one memory is storing instructions, that when executed by the at least one processor, cause the apparatus to perform:
adding circuitry configured to add, when a reference signal received power with respect to said serving cell of said terminal acquired with said radio resource management measurements with respect to said serving cell of said terminal is equal to or larger than a first reference signal received power threshold, said radio resource management measurements with respect to said serving cell of said terminal to said relaxation mode scope of said radio resource management measurements relaxation mode.

14. The apparatus according to claim 9, wherein the at least one memory is storing instructions, that when executed by the at least one processor, cause the apparatus to perform;
controlling circuitry configured to control radio resource management measurements relaxation with respect to neighbor cells of said terminal based on a reference signal received power with respect to said serving cell of said terminal acquired with said radio resource management measurements with respect to said serving cell of said terminal, and said information on said parameter indicative of said total power received by said terminal at said frequency band.

15. The apparatus according to claim 9, wherein:
said information on said parameter indicative of said total power received by said terminal at said frequency band is a value of a total received power indicator, or
said information on said parameter indicative of said total power received by said terminal at said frequency band is a change of said total received power indicator per unit time.

16. An apparatus comprising At least one processor; and at least one memory storing instructions, that when executed by the at least one processor, cause the apparatus at least to:
perform with a terminal in a radio resource management measurements relaxation mode having a reduced radio resource management measurements activity within a first relaxation mode scope as a relaxation mode scope of said radio resource management measurements relaxation mode, the terminal being served with a radio cell in a frequency band, operations comprising:
  at least one processor,
  at least one non-transitory memory including computer program code, and
  at least one interface configured for communication with at least another apparatus, the at least one processor, with the at least one memory and the computer program code, being configured to cause the apparatus to perform:
    achieving information on a parameter indicative of a total power received by said terminal at said frequency band, and
    deciding on a change of said relaxation mode scope of said radio resource management measurements relaxation mode based on said information on said parameter indicative of said total power received by said terminal at said frequency band,
  wherein said first relaxation mode scope includes radio resource management measurements with respect to intra-frequency neighbor cells of said terminal, inter-frequency radio resource management measurements, or inter-radio-access-technology radio resource management measurements, and
  wherein the said first relaxation mode is performed in RRC_INACTIVE, RRC_IDLE, and RRC_Connected.

* * * * *